US010286421B2

(12) United States Patent
Suzuki et al.

(10) Patent No.: US 10,286,421 B2
(45) Date of Patent: May 14, 2019

(54) PHOTOSENSITIVE COMPOSITION, METHOD FOR PRODUCING CURED PRODUCT, CURED FILM, DISPLAY DEVICE, AND TOUCH PANEL

(71) Applicant: FUJIFILM CORPORATION, Minato-ku, Tokyo (JP)

(72) Inventors: Shigekazu Suzuki, Shizuoka (JP); Yuzo Fujiki, Shizuoka (JP)

(73) Assignee: FUJIFILM CORPORATION, Tokyo (JP)

( * ) Notice: Subject to any disclaimer, the term of this patent is extended or adjusted under 35 U.S.C. 154(b) by 100 days.

(21) Appl. No.: 15/338,464

(22) Filed: Oct. 31, 2016

(65) Prior Publication Data

US 2017/0137605 A1 May 18, 2017

(30) Foreign Application Priority Data

Nov. 17, 2015 (JP) ................................. 2015-224382
Mar. 14, 2016 (JP) ................................. 2016-049470

(51) Int. Cl.
*C09D 133/08* (2006.01)
*B05D 3/06* (2006.01)

(52) U.S. Cl.
CPC .......... *B05D 3/067* (2013.01); *C09D 133/08* (2013.01)

(58) Field of Classification Search
CPC ............................. C09D 133/08; B05D 3/067
See application file for complete search history.

(56) References Cited

U.S. PATENT DOCUMENTS

2012/0263946 A1* 10/2012 Mitsukura ......... H01L 21/67132
428/345
2015/0382473 A1* 12/2015 Okamoto ................. G03F 7/11
174/250

FOREIGN PATENT DOCUMENTS

JP         4273894 B2     6/2009
JP         2014-197171 A  10/2014

* cited by examiner

*Primary Examiner* — Sanza L. McClendon
(74) *Attorney, Agent, or Firm* — SOLARIS Intellectual Property Group, PLLC

(57) ABSTRACT

It is an object of the present invention to provide a photosensitive composition capable of producing a cured product having an excellent adhesion and excellent corrosion prevention performance on a metal wiring, a method of manufacturing a cured product using the photosensitive composition, a cured film obtained by curing the photosensitive composition, as well as a display device and a touch panel including the cured film.

A photosensitive composition comprises a compound having two or more ethylenically unsaturated bonds; a photopolymerization initiator; silica particles; at least one heterocyclic compound selected from the group consisting of a triazole compound, a tetrazole compound, a thiadiazole compound, a triazine compound, a rhodanine compound, a benzothiazole compound and a benzimidazole compound; a maleimide compound; and a solvent; wherein an organic solid content per 1 mol of ethylenically unsaturated bonds in the photosensitive composition is 250 g/mol or less.

16 Claims, 3 Drawing Sheets

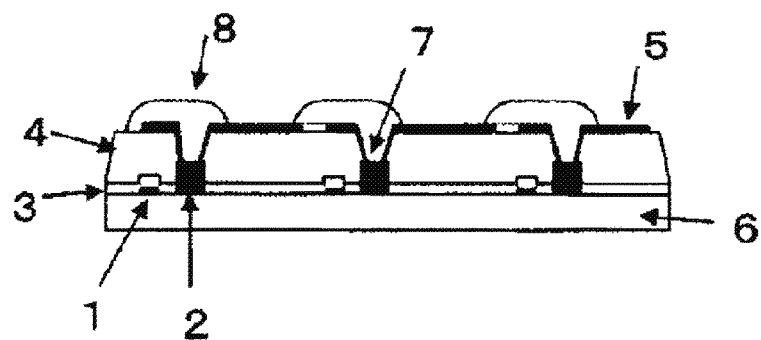
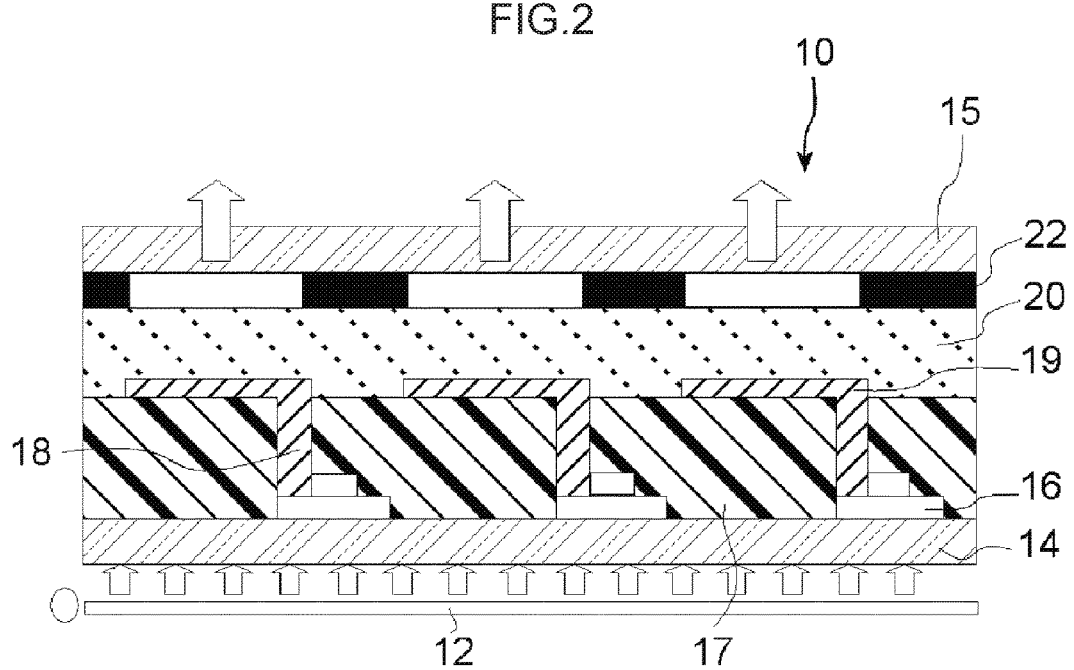

PHOTOSENSITIVE COMPOSITION, METHOD FOR PRODUCING CURED PRODUCT, CURED FILM, DISPLAY DEVICE, AND TOUCH PANEL

CROSS-REFERENCE TO RELATED APPLICATION

The present application claims priority under 35 U.S.C. § 119 to Japanese Patent Application No. 2015-224382 filed on Nov. 17, 2015, and Japanese Patent Application No. 2016-049470 filed on Mar. 14, 2016. The contents of these applications are incorporated herein by reference in their entireties.

TECHNICAL FIELD

The present invention relates to a photosensitive composition, a method of manufacturing a cured product, a cured film, a display device, and, a touch panel.

RELATED ART

Flat panel displays such as liquid crystal display devices and organic EL (Electroluminescence) display devices are widely used. With the diffusion of smartphones and tablet terminals in recent years, capacitive type touch panels are drawing attentions. A sensor substrate in a capacitive type touch panel generally has a structure which includes: wirings including transparent electrodes (such as electrodes made of ITO (Indium Tin Oxide) and IZO (Indium Zinc Oxide)) and metal electrodes (such as electrodes made of metals, such as silver, copper, molybdenum, titanium, aluminum, and laminated bodies and alloys thereof) patterned on a glass or a film; insulating films provided at the intersections of the wirings; and protective films for protecting ITO and metals.

For example, Japanese Patent Application Laid-Open (JP-A) No. 2014-197171 discloses, as a conventional photosensitive composition, a photosensitive resin composition including an alkali-soluble resin (A), a metal chelate compound (B), and a maleimide compound (C); wherein the metal chelate compound (B) is a compound represented by General Formula (1), and wherein the maleimide compound (C) is a compound including a substituent represented by General Formula (2).

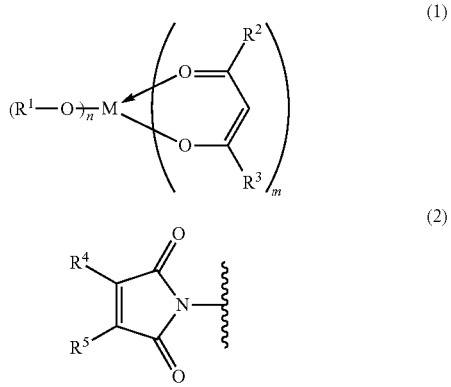

(In General Formula (1), M represents a titanium atom, a zirconium atom, an aluminum atom or a magnesium atom; $R^1$ represents a hydrogen atom, an alkyl group having from 1 to 10 carbon atoms, a cycloalkyl group having from 4 to 10 carbon atoms, or an aryl group having from 6 to 15 carbon atoms; each of $R^2$ and $R^3$ independently represents a hydrogen atom, an alkyl group having from 1 to 20 carbon atoms, a cycloalkyl group having from 4 to 10 carbon atoms, an aryl group having from 6 to 15 carbon atoms, an alkoxy group having from 1 to 6 carbon atoms, or a hydroxy group; and n and m are an integer from 0 to 4, wherein n+m=2 to 4; and wherein in General Formula (2), each of $R^4$ and $R^5$ independently represents a hydrogen atom, an alkyl group having from 1 to 10 carbon atoms, a cycloalkyl group having from 4 to 10 carbon atoms, or an aryl group having from 6 to 15 carbon atom; or an alkylene chain having from 1 to 10 carbon atoms, a cycloalkylene chain having from 4 to 10 carbon atoms, or an arylene chain having from 6 to 15 carbon atoms, in which $R^4$ and $R^5$ together form a ring.)

Further, as a conventional photosensitive composition, Japanese Patent (JP-B) No. 4273894 discloses, for example, a resin composition which is used for forming a protective film in a printed wiring board, wherein the resin composition includes a bismaleimide compound (A), a photopolymerization initiator (B), a photopolymerizable compound (C) containing an ethylenically unsaturated bond, a thermosetting resin (D), and a triazole compound (E) represented by the following General Formula (1a) or (1b), and wherein the resin composition is cured by light or heat.

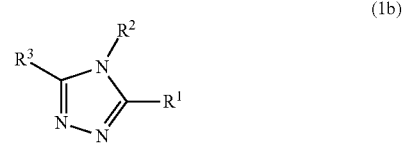

(In Formula (1a) and (1b), each of $R^1$, $R^2$ and $R^3$ independently represents a hydrogen atom, an amino group, a mercapto group, a carboxyl group or a hydrazino group; and at least one of $R^1$, $R^2$ or $R^3$ is an amino group or a mercapto group.)

SUMMARY OF THE INVENTION

Problems to be Solved by the Invention

An object of one embodiment of the present invention is to provide a photosensitive composition capable of producing a cured product having an excellent adhesion and excellent corrosion prevention performance on a metal wiring, a method of manufacturing a cured product using the photosensitive composition, a cured film obtained by curing the photosensitive composition, as well as a display device and a touch panel including the cured film.

Means for Solving the Problems

The above described object has been achieved by the following means <1>, <10>, <12>, <14> or <15>. The means <2> to <9>, <11>, and <13>, which are preferred embodiments of the present invention, are also described below.

<1> A photosensitive composition comprising at least:
a compound having two or more ethylenically unsaturated bonds;
a photopolymerization initiator,
silica particles;
at least one heterocyclic compound selected from the group consisting of a triazole compound, a tetrazole compound, a thiadiazole compound, a triazine compound, a rhodanine compound, a benzothiazole compound and a benzimidazole compound,
a maleimide compound; and
a solvent;
wherein an organic solid content per 1 mol of ethylenically unsaturated bonds in the photosensitive composition is 250 g/mol or less.

<2> The photosensitive composition according to <1>, wherein the photopolymerization initiator is an oxime ester compound.

<3> The photosensitive composition according to <1> or <2>, wherein a content of the silica particles with respect to a total solid content of the photosensitive composition is 5% by mass or more but less than 40% by mass.

<4> The photosensitive composition according to any one of <1> to <3>, wherein the silica particles have an average primary particle size of from 1 to 30 nm.

<5> The photosensitive composition according to any one of <1> to <4>, wherein the heterocyclic compound is a compound represented by any one of the following Formula D1 to Formula D11:

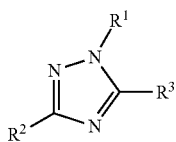
Formula D1

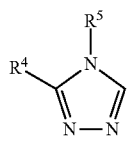
Formula D2

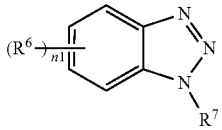
Formula D3

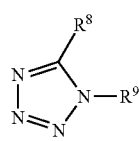
Formula D4

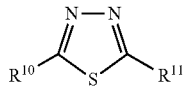
Formula D5

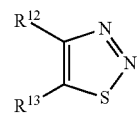
Formula D6

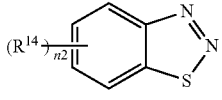
Formula D7

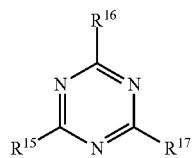
Formula D8

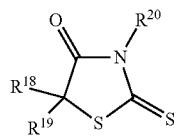
Formula D9

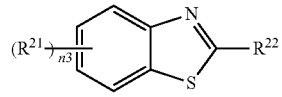
Formula D10

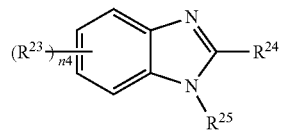
Formula D11 wherein, in Formula D1 to Formula D11, each of $R^1$, $R^5$, $R^7$, $R^9$, $R^{20}$ and $R^{25}$ independently represents a hydrogen atom, an alkyl group, an aryl group, an heteroaryl group or an amino group; each of $R^2$ to $R^4$, $R^8$, $R^{10}$ to $R^{13}$, $R^{15}$ to $R^{18}$, $R^{22}$ and $R^{24}$ independently represents a hydrogen atom, an alkyl group, an aryl group, a heteroaryl group, an amino group, an alkylamino group, an arylamino group, a dialkylamino group, a diarylamino group, an alkylarylamino group, a mercapto group, an alkylthio group or an arylthio group; each of $R^6$, $R^{14}$, $R^{21}$ and $R^{23}$ independently represents a halogen atom, an alkyl group, an aryl group, a heteroaryl group, an amino group, an alkylamino group, an arylamino group, a dialkylamino group, a diarylamino group, an alkylarylamino group, a mercapto group, an alkylthio group, an arylthio group, a hydroxy group, an alkoxy group or an aryloxy group; $R^{19}$ represents a hydrogen atom, an alkyl group, an aryl group or a heteroaryl group; and each of n1 to n4 independently represents an integer from 0 to 4.

<6> The photosensitive composition according to <5>, wherein the heterocyclic compound is a compound represented by any one of the Formula D1, Formula D2 and Formula D4 to Formula D11.

<7> The photosensitive composition according to <5> or <6>, wherein the heterocyclic compound is a compound represented by any one of the Formula D4 to Formula D11.

<8> The photosensitive composition according to any one of <1> to <7>, wherein the maleimide compound comprises a compound represented by the following Formula E1:

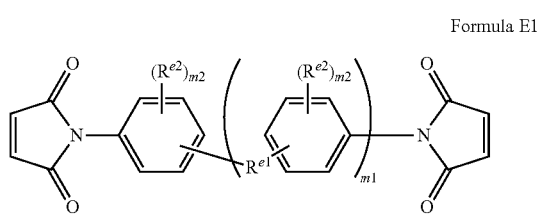
Formula E1 wherein, in Formula E1, each of $R^{e1}$s independently represents a single bond, an alkylene group, —$SO_2$—, —SO—, —S— or —O—; each of $R^{e2}$s independently represents a halogen atom or an alkyl group; m1 represents an integer from 0 to 5; and each of m2s independently represents an integer from 0 to 4.

<9> The photosensitive composition according to any one of <1> to <8>, wherein the compound having two or more ethylenically unsaturated bonds comprises a multifunctional (meth)acrylate compound.

<10> A method of manufacturing a cured product, the method comprising, in the following order:

coating the photosensitive composition according to any one of <1> to <9> on a substrate;

removing the solvent from the coated photosensitive composition;

exposing at least a part of the coated photosensitive composition from which the solvent has been removed to actinic radiation; and subjecting the exposed photosensitive composition to a heat treatment.

<11> The method of manufacturing a cured product according to <10>, further comprising:

developing the exposed photosensitive composition with an aqueous developer, after exposing at least a part of the coated photosensitive composition from which the solvent has been removed to actinic radiation and before subjecting the exposed photosensitive composition to a heat treatment.

<12> A cured film obtained by curing the photosensitive composition according to any one of <1> to <9>.

<13> The cured film according to <12>, which is an interlayer insulating film or an overcoat film.

<14> A display device comprising the cured film according to <12> or <13>.

<15> A touch panel comprising the cured film according to <12> or <13>.

Advantageous Effects of Invention

According to one of embodiment of the present invention, it is possible to provide a photosensitive composition capable of producing a cured product having an excellent adhesion and excellent corrosion prevention performance on a metal wiring, a method of manufacturing a cured product using the photosensitive composition, a cured film obtained by curing the photosensitive composition, as well as a display device and a touch panel including the cured film.

BRIEF DESCRIPTION OF THE DRAWINGS

FIG. 1 is a schematic configuration diagram of an example of an organic EL display device, showing a schematic sectional view of a substrate in a bottom-emission type organic EL display device, the substrate including a planarization film 4.

FIG. 2 is a schematic configuration diagram of an example of a liquid crystal display device, showing a schematic sectional view of an active matrix substrate in the liquid crystal display device, the substrate including a cured film 17, which is an interlayer insulating film.

DETAILED DESCRIPTION OF THE INVENTION

Figure 3:
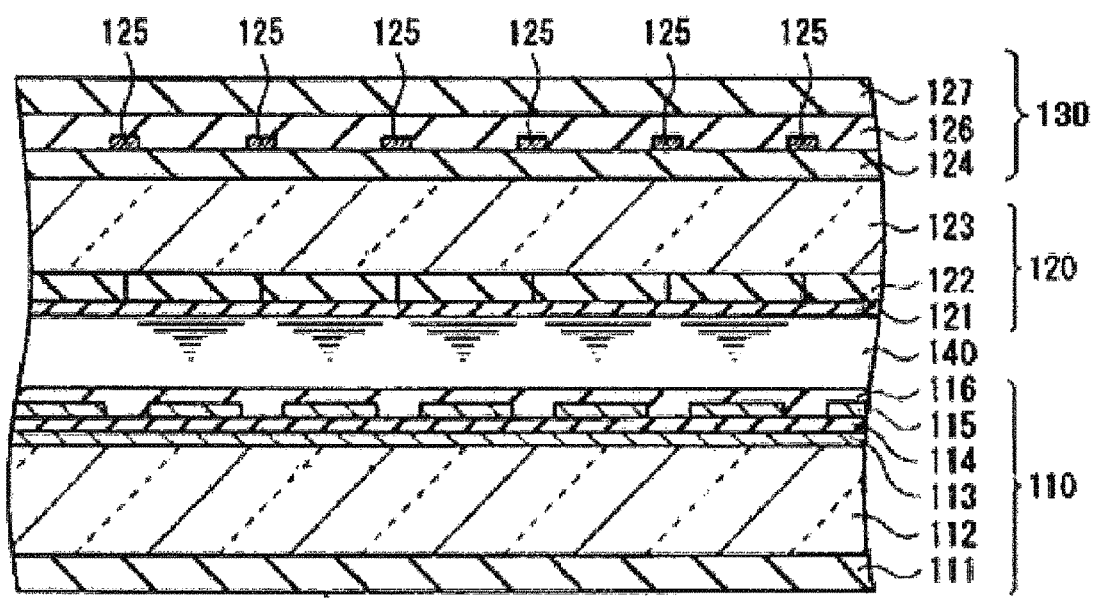
FIG. 3 is a schematic configuration diagram of an example of a liquid crystal display device having a function of a touch panel.

The present disclosure will now be described below in detail. The following description regarding the components of the present disclosure may be given based on representative embodiments of the present disclosure. However, the present disclosure is by no means limited by the embodiments. In the present specification, an expression "from * to" is used to refer to a range in which numerical values described before and after the "to" are included in the range as the lower limit value and the upper limit value thereof.

In the description of a group (atomic group) in the specification, when it is not specified whether the group is substituted or non-substituted, it means that the group encompasses both the group containing a substituent, and the group containing no substituent. For example, the term "alkyl group" encompasses not only an alkyl group (non-substituted alkyl group) which does not contain a substituent, but also an alkyl group (substituted alkyl group) which contains a substituent.

Further, a chemical structural formula in the specification may be shown as a simplified structural formula in which hydrogen atoms are not shown.

In the specification, the term "(meth)acrylate" refers to both acrylate and methacrylate compounds, the term "(meth)acrylic" refers to both acrylic and methacrylic compounds, and "(meth)acryloyl" refers to both acryloyl and methacryloyl compounds.

The term "polymerizable monomer" or the like is also referred simply as "component A" or the like, in the present disclosure.

Further, the terms "% by mass" and "% by weight" have the same meaning, and the terms "parts by mass" and "parts by weight" have the same meaning, in the present disclosure.

In the present disclosure, a combination of two or more preferred embodiments is a more preferred embodiment.

In the present disclosure, a weight average molecular weight and a number average molecular weight of a polymer component refer to the weight average molecular weight in terms of polystyrene, as measured by gel permeation chromatography (GPC), using tetrahydrofuran (THF) as a solvent.

(Photosensitive Composition)

A photosensitive composition (hereinafter, also simply referred to as the "composition") of the present disclosure includes at least: a compound having two or more ethylenically unsaturated bonds; a photopolymerization initiator; silica particles; at least one heterocyclic compound selected from the group consisting of a triazole compound, a tetrazole compound, a thiadiazole compound, a triazine compound, a rhodanine compound, a benzothiazole compound and a benzimidazole compound; a maleimide compound; and a solvent; wherein an organic solid content per 1 mol of ethylenically unsaturated bonds in the photosensitive composition is 250 g/mol or less.

Further the photosensitive composition of the present disclosure is preferably a negative-type photosensitive composition.

It is preferable that the photosensitive composition of the present disclosure can be patterned by photolithography, using an aqueous developer. When the photosensitive composition of the present disclosure is patterned by photolithography using an aqueous developer, a pattern to be formed is a negative-type pattern, in which exposed portions remain as the pattern.

In the fields of display devices and touch panels, particularly in the field of touch panels, there is a trend to require a metal wiring having a lower-resistance. A wiring made of Cu, a Cu alloy, or a Mo/Al/Mo laminated body having a low resistance value is increasingly used and studied. Although the use of such a metal wiring serves to reduce the resistance value, the metal wiring becomes more susceptible to metal corrosion. Accordingly, an overcoat material used for coating the wiring is required to have a corrosion prevention performance.

The present inventors have found out that, although the use of a heterocyclic compound in the photosensitive composition allows the composition to have a corrosion prevention effect on a metal wiring, the use thereof causes, at the same time, a problem of decreasing the adhesion of a resulting cured product.

In view of the above problems, the present inventors have made intensive studies to find out the following. Specifically, when a compound having two or more ethylenically unsaturated bonds, a specific heterocyclic compound, a maleimide compound, and silica particles are incorporated into the photosensitive composition, and when the solid content per 1 mol of ethylenically unsaturated bonds with respect to the total amount of the photosensitive composition is adjusted to a specific range, these factors work in concert to provide a photosensitive composition which is capable of producing a cured product having an excellent adhesion, and an excellent corrosion prevention performance on a metal wiring. However, detailed mechanism for providing such an effect is unknown.

Each of the components included in the photosensitive composition of the present disclosure will now be described below.

In the photosensitive composition of the present disclosure, the organic solid content per 1 mol of ethylenically unsaturated bonds (hereinafter, also referred to as "ethylenically unsaturated bond equivalent" or "C=C equivalent") in the photosensitive composition is 250 g/mol or less.

When the organic solid content per 1 mol of ethylenically unsaturated bonds in the photosensitive composition is more than 250 g/mol, the resulting cured product not only has a poor adhesion, but also has a poor hardness.

The "solid" in the photosensitive composition as used in the present disclosure refers to components contained in the composition, excluding volatile components such as a solvent. Further, the "organic solid" in the photosensitive composition refers to the above described "solid", excluding inorganic components such as silica particles.

In the present disclosure, the ethylenically unsaturated bond equivalent of a composition refers to the organic solid content per 1 mol of ethylenically unsaturated bonds in the composition, and the ethylenically unsaturated bond equivalent of a compound refers to a mass per 1 mol of ethylenically unsaturated bonds in the compound.

The ethylenically unsaturated bond equivalent of a composition and the ethylenically unsaturated bond equivalent of a compound can be obtained specifically, for example, as follows.

The ethylenically unsaturated bond equivalent of dipentaerythritol hexaacrylate (DPHA, molecular weight: 578, number of ethylenically unsaturated bonds: 6): 578/6=96.3 (g/mol)

The ethylenically unsaturated bond equivalent of styrene (molecular weight: 104, number of ethylenically unsaturated bond: 1): 104/1=104 (g/mol)

The ethylenically unsaturated bond equivalent of "a mixed composition of 10 g of DPHA and 90 g of nonreactive organic polymer": 578/6/(10/(90+10))=963 (g/mol)

The ethylenically unsaturated bond equivalent as used in the present disclosure can be obtained by identifying the molecular weight of a compound, and the number of ethylenically unsaturated bonds in the compound, as well as the composition of an ethylenically unsaturated compound in the composition, by a known method, and then by performing a calculation based on the above described calculation method.

The organic solid content per 1 mol of ethylenically unsaturated bonds in the photosensitive composition of the present disclosure is preferably from 30 to 250 g/mol, more preferably from 80 to 250 g/mol, yet more preferably from 100 to 250 g/mol, particularly preferably from 130 to 250 g/mol, and most preferably from 150 to 220 g/mol. When the organic solid content is within the above range, the resulting cured product has a more excellent adhesion and hardness.

Further, in the photosensitive composition of the present disclosure, the content of an organic compound(s) (such as a polymer) having a molecular weight (weight average molecular weight) of more than 1,000 is preferably 50% by mass or less, and more preferably, 30% by mass or less, with respect to a total solid content of the photosensitive composition. When the content of the organic compound is within the above range, the ethylenically unsaturated bond equivalent of the photosensitive composition can be easily adjusted to the range described above, and at the same time, the resulting cured product has a more excellent adhesion and hardness.

The organic compound having a molecular weight (weight average molecular weight) of more than 1,000 is preferably a compound having two or more ethylenically unsaturated bonds, namely, a compound which corresponds to the compound having two or more ethylenically unsaturated bonds to be described later. In such an embodiment, the ethylenically unsaturated bond equivalent of the photosensitive composition can be easily adjusted to the above range, and at the same time, the resulting cured product has a more excellent adhesion and hardness.

Further, from the viewpoint of adhesion, the above described compound preferably has a molecular weight (weight average molecular weight) of 100,000 or less, more preferably 50,000 or less, and yet more preferably 40,000 or less.

<Compound Having Two or More Ethylenically Unsaturated Bonds>

The photosensitive composition of the present disclosure includes a compound having two or more ethylenically unsaturated bonds.

The compound having two or more ethylenically unsaturated bonds is preferably a compound which does not have a maleimide ring structure, namely, a compound other than the maleimide compound to be described later.

The compound having two or more ethylenically unsaturated bonds may be a compound having a low molecular weight, an oligomer, or a polymer. However, of the total amount of the compound having two or more ethylenically unsaturated bonds contained in the photosensitive composition of the present disclosure, preferably 30% by mass or more is a compound having a molecular weight of 1,000 or less, more preferably 40% by mass or more is the compound having a molecular weight of 1,000 or less, and particularly preferably 50% by mass or more is the compound having a molecular weight of 1,000 or less.

The molecular weight (weight average molecular weight, in a case in which the compound has a molecular weight distribution) of the compound having two or more ethylenically unsaturated bonds used in the present disclosure, is preferably from 100 to 100,000, more preferably from 200 to 50,000, and yet more preferably 300 to 40,000, from the viewpoint of the hardness of the resulting cured product.

The number of ethylenically unsaturated bonds contained in the compound having two or more ethylenically unsaturated bonds is not particularly limited. However, in the case of the compound having a molecular weight of 1,000 or less, the number of ethylenically unsaturated bonds is preferably from 2 to 20, more preferably from 3 to 16, and yet more preferably from 4 to 10.

The compound having two or more ethylenically unsaturated bonds preferably contains a compound having an ethylenically unsaturated bond equivalent of less than 150 g/mol, and more preferably a compound having an ethylenically unsaturated bond equivalent of 100 g/mol or less.

Further, of the total amount of the compound having two or more ethylenically unsaturated bonds contained in the photosensitive composition of the present disclosure, preferably 30% by mass or more is the compound having an ethylenically unsaturated bond equivalent of less than 150 g/mol, more preferably 40% by mass or more is the compound having an ethylenically unsaturated bond equivalent of less than 150 g/mol, and particularly preferably 50% by mass or more is the compound having an ethylenically unsaturated bond equivalent of less than 150 g/mol.

The compound having two or more ethylenically unsaturated bonds is not particularly limited, and the compound can be selected as appropriate depending on purposes. Examples thereof include ester compounds, amide compounds, urethane compounds and other compounds. In particular, it is preferable that the compound having two or more ethylenically unsaturated bonds includes a multifunctional (meth)acrylate compound.

Examples of the ester compound include (meth)acrylic acid esters, itaconic acid esters, crotonic acid esters, isocrotonic acid esters, maleic acid esters, and other ester compounds. Of these, a multifunctional (meth)acrylic acid ester (multifunctional (meth)acrylate compound) or the like is preferred.

Examples of the multifunctional (meth)acrylate compound include polyethylene glycol di(meth)acrylate, ethylene glycol di(meth)acrylate, triethylene glycol di(meth)acrylate, 1,3-butanediol di(meth)acrylate, tetramethylene glycol di(meth)acrylate, hexanediol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, dipentaerythritol penta(meth)acrylate, dipentaerythritol hexa(meth)acrylate, sorbitol tri(meth)acrylate, sorbitol tetra(meth)acrylate, trimethylolethane tri(meth)acrylate, neopentyl glycol di(meth)acrylate and hexanediol di(meth)acrylate. Of these, pentaerythritol tri(meth)acrylate, pentaerythritol tetra(meth)acrylate, dipentaerythritol penta(meth)acrylate, and/or dipentaerythritol hexa(meth)acrylate is/are particularly preferred.

Other examples of the multifunctional (meth)acrylate compound include: compounds obtained by adding ethylene oxide or propylene oxide glycerin to a multifunctional alcohol such as glycerin, trimethylolethane, or bisphenol A, followed by (meth)acrylation; urethane acrylates disclosed in Japanese Patent Publication (JP-B) No. S48-41708, JP-B No. S50-6034, and JP-A No. S51-37193 A; polyester acrylates disclosed in JP-A No. S48-64183, JP-B No. S49-43191, and JP-B No. S52-30490; epoxy acrylates which are reaction products of an epoxy resin with a (meth)acrylic acid; and (meth)acrylic acid esters, urethane (meth)acrylates, and vinyl esters disclosed in JP-A No. S60-258539.

Examples of other multifunctional ethylenically unsaturated compounds include trimethylolpropane tri(acryloyloxypropyl) ether, tri(acryloyloxyethyl)isocyanurate, and photocurable monomers and oligomers described in Journal of the Adhesion Society of Japan Vol. 20, No. 7, page from 300 to 308.

Examples of the amide compound include an amide (monomer) of an unsaturated carboxylic acid with an aliphatic polyvalent amine compound. Specific examples thereof include methylene bis(meth)acrylamide, 1,6-hexamethylene bis(meth)acrylamide, diethylenetriamine tris(meth)acrylamide, xylylene bis(meth)acrylamide, and (meth)acrylic acid amide disclosed in JP-A No. S60-258539.

Examples of the urethane compound include a urethane chain-polymerizable compound produced by an addition reaction of isocyanate with a hydroxyl group. Examples thereof include an urethanated product of pentaerythritol triacrylate with hexamethylene diisocyanate; an urethanated product of pentaerythritol triacrylate with toluene diisocyanate; an urethanated product of pentaerythritol triacrylate with isophorone diisocyanate; an urethanated product of dipentaerythritol pentaacrylate with hexamethylene diisocyanate; an urethanated product of dipentaerythritol pentaacrylate with toluene diisocyanate; and an urethanated product of dipentaerythritol pentaacrylate with isophorone diisocyanate.

Specific examples thereof include urethane acrylates such as those disclosed in JP-A No. 2011-126921, JP-A No. S51-37193 A, JP-B No. H2-32293, and JP-B No. H2-16765, all of which disclosures are incorporated herein.

Further, other examples of the multifunctional ethylenically unsaturated compound include allyl compounds and alkenyl group-containing compounds disclosed in JP-A No. S60-258539 A, and WO 2010/050580.

Specific examples thereof include 1,2-divinylbenzene, 1,4-divinylbenzene, 1,2-diallylbenzene, 1,3-diallylbenzene, 1,4-diallylbenzene, 1,3,5-trivinylbenzene, 1,3,5-triallylbenzene, 1,2,4,5-tetraallylbenzene, hexaallylbenzene, divinyltoluene, bisphenol A diallyl ether, 1,2-diallyloxybenzene, 1,4-diallyloxybenzene, diallyl terephthalate, diallyl isophthalate, 1,4-bis(dimethylvinylsilyl)benzene, divinylmethylphenylsilane, divinyldiphenylsilane, and diallyldiphenylsilane.

In a case in which a compound having a molecular weight (weight average molecular weight, in a case in which the compound has a molecular weight distribution) of more than 1,000, such as a polymer, is used as the compound having two or more ethylenically unsaturated bonds, the compound having a molecular weight of more than 1,000 preferably contain an acid group, from the viewpoint of developability. The acid group is preferably carboxyl group.

Further, as the compound having a molecular weight of more than 1,000, various types of resins having two or more ethylenically unsaturated bonds can be used. Of these, an acrylic resin having two or more ethylenically unsaturated bonds is preferred, and an acrylic resin including a structural unit containing an ethylenically unsaturated bond is more preferred.

The ethylenically unsaturated group contained in the compound having a molecular weight of more than 1,000 is not particularly limited, and preferred examples thereof include an allyl group.

The photosensitive composition of the present disclosure may contain the compound having two or more ethylenically unsaturated bonds singly, or two or more kinds thereof may be contained.

The content of the compound having two or more ethylenically unsaturated bonds in the photosensitive composition of the present disclosure is preferably from 20 to 85% by mass, more preferably from 30 to 80% by mass, and particularly preferably from 40 to 75% by mass or more, with respect to the total solid content of the photosensitive composition. When the content of the compound is within the above range, the resulting cured product has a more excellent adhesion, and at the same time, the resulting cured product has an excellent hardness and transparency.

<Photopolymerization Initiator>

The photosensitive composition of the present disclosure includes a photopolymerization initiator.

The photosensitive composition preferably includes a photoradical polymerization initiator as the photopolymerization initiator.

The photoradical polymerization initiator which can be used in the present disclosure is a compound capable of initiating and/or accelerating the polymerization of the ethylenically unsaturated compound and the like, in response to light.

"Light" is not particularly limited as long as the light is an actinic energy ray capable of imparting an energy which can generate an initiating species from a photopolymerization initiator, by the irradiation of the light, and encompasses a wide range of alpha-rays, gamma-rays, X-rays, UV light (UV), visible light, and electron beams. Of these, light including at least UV light is preferred.

Examples of the photopolymerization initiator include oxime ester compounds, organic halogenated compounds, oxydiazole compounds, carbonyl compounds, ketal compounds, benzoin compounds, acridine compounds, organic peroxide compounds, azo compounds, cumarin compounds, azido compounds, metallocene compounds, hexaarylbiimidazole compounds, organic boric acid compounds, disulfonic acid compounds, onium salt compounds, and acylphosphine oxide compounds. Of these, the photopolymerization initiator is preferably an oxime ester compound and/or a hexaarylbiimidazole compound, and more preferably an oxime ester compound, from the viewpoint of sensitivity.

As the oxime ester compound, the compounds disclosed in JP-A No. 2000-80068, JP-A No. 2001-233842, Japanese National-Phase Publication (JP-A) No. 2004-534797, JP-A No. 2007-231000, and JP-A No. 2009-134289 can be used.

The oxime ester compound is preferably a compound represented by the following Formula b-1 or Formula b-2.

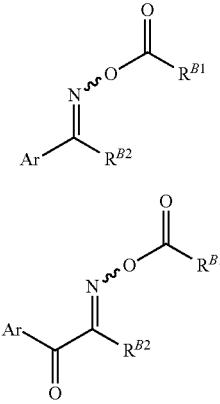

In Formula b-1 or Formula b-2, Ar represents an aromatic group or a heteroaromatic group; $R^{B1}$ represents an alkyl group, an aromatic group or an alkyloxy group; $R^{B2}$ represents a hydrogen atom or an alkyl group; and $R^{B2}$ and an Ar group may be bound together to form a ring.

In Formula b-1 or Formula b-2, Ar represents an aromatic group or a heteroaromatic group. Ar is preferably a group obtained by removing one hydrogen atom from a benzene ring compound, a naphthalene ring compound or a carbazole ring compound, and more preferably a naphthalenyl group or a carbazolyl group which forms a ring together with $R^{B2}$. Preferred examples of hetero atoms contained in the heteroaromatic group include nitrogen atom, oxygen atom, and sulfur atom.

$R^{B1}$ represents an alkyl group, aromatic group or an alkoxy group. $R^{B1}$ is preferably a methyl group, an ethyl group, a benzyl group, a phenyl group, a naphthyl group, a methoxy group or an ethoxy group, and more preferably a methyl group, an ethyl group, a phenyl group or a methoxy group.

$R^{B2}$ represents a hydrogen atom or an alkyl group. $R^{B2}$ is preferably a hydrogen atom or a substituted alkyl group, and more preferably a hydrogen atom, a substituted alkyl group which forms a ring together with Ar, or a toluene thioalkyl group.

Further, Ar is preferably a group having from 4 to 20 carbon atoms, $R^{B1}$ is preferably a group having from 1 to 30 carbon atoms, and $R^{B2}$ is preferably a group having from 1 to 50 carbon atoms.

The oxime ester compound is yet more preferably a compound represented by the following Formula b-3, Formula b-4 or Formula b-5.

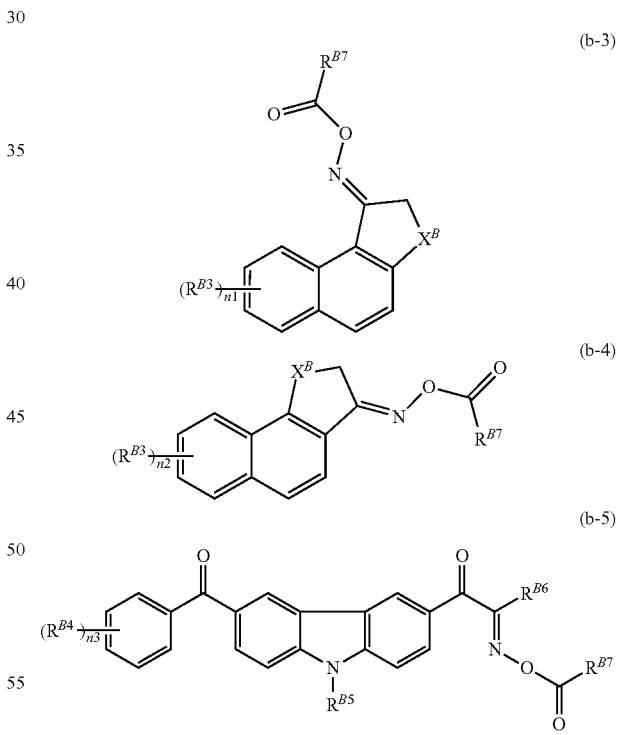

In Formula b-3, Formula b-4, or Formula b-5, $R^{B7}$ represents an alkyl group, an aromatic group or an alkoxy group; $X^B$ represents —$CH_2$—, —$C_2H_4$—, —O— or —S—; each of $R^{B3}$s independently represents a halogen atom; each of $R^{B4}$s independently represents an alkyl group, a phenyl group, an alkyl-substituted amino group, an arylthio group, an alkylthio group, an alkoxy group, an aryloxy group or a halogen atom; $R^{B5}$ represents a hydrogen atom, an alkyl group or an aryl group; $R^{B6}$ represents an alkyl group; each of n1 and n2 independently represents an integer from 0 to 6; and n3 represents an integer from 0 to 5.

$R^{B7}$ is preferably a group represented by $R^{B11}$—X'-alkylene group- (wherein $R^{B11}$ represents an alkyl group or an aryl group, and X' represents a sulfur atom or an oxygen atom). $R^{B11}$ is preferably an aryl group, and more preferably a phenyl group. The alkyl group and aryl group as $R^{B11}$ may be substituted by a halogen atom (preferably, a fluorine atom, a chlorine atom or a bromine atom) or an alkyl group.

$X^B$ is preferably a sulfur atom.

Each of $R^{B3}$s and $R^{B4}$s is capable of binding to an arbitrary position on the aromatic ring.

Each of $R^{B4}$s is preferably an alkyl group, a phenyl group, an arylthio group or a halogen atom, more preferably an alkyl group, an arylthio group or a halogen atom, and yet more preferably an alkyl group or a halogen atom. The alkyl group for each of $R^{B4}$s is preferably an alkyl group having from 1 to 5 carbon atoms, and more preferably a methyl group or an ethyl group. The halogen atom is preferably a chlorine atom, a bromine atom or a fluorine atom.

Further, the number of carbon atoms in each of $R^{B4}$s is preferably from 0 to 50, and more preferably from 0 to 20.

$R^{B5}$ is preferably an alkyl group. The alkyl group for $R^{B5}$ is preferably an alkyl group having from 1 to 5 carbon atoms, and more preferably a methyl group or an ethyl group. The aryl group for $R^{B5}$ is preferably an aryl group having from 6 to 10 carbon atoms.

$R^{B6}$ is preferably an alkyl group having from 1 to 5 carbon atoms, and more preferably a methyl group or an ethyl group.

Each of n1 and n2 represents the number of substitutions by $R^{B3}$ on the aromatic ring in Formula b-3 or Formula b-4; and n3 represents the number of substitutions by $R^{B4}$ on the aromatic ring in Formula b-5.

Each of n1 to n3 preferably independently represents an integer from 0 to 2, more preferably, 0 or 1.

Examples of the oxime ester compound preferably used in the present disclosure will be shown below. However, the oxime ester compound used in the present disclosure is by no means limited to those examples shown below. In the following Formulas, Me represents a methyl group, and Ph represents a phenyl group. Further, regarding a cis-trans isomerism of an oxime double bond in the following compounds, the compounds may be either E or Z isomers, or may be a mixture of E and Z isomers.

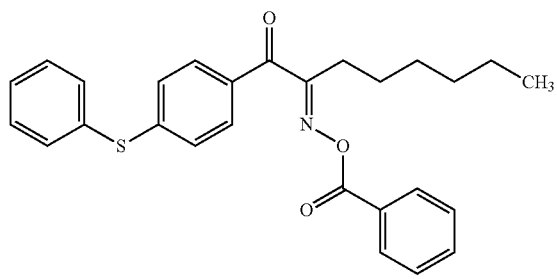

PI-1

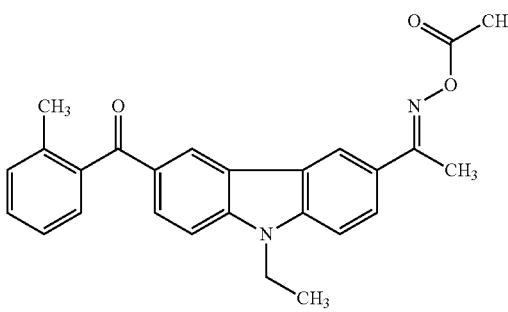

PI-2

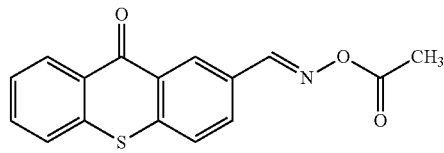

PI-3

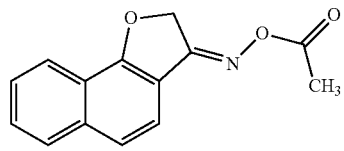

PI-4

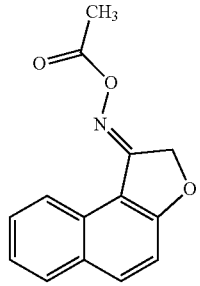

PI-5

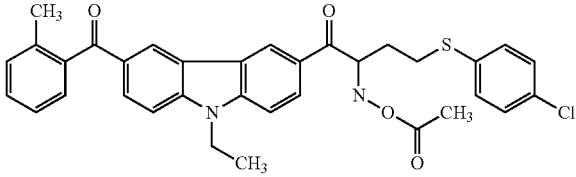

PI-6

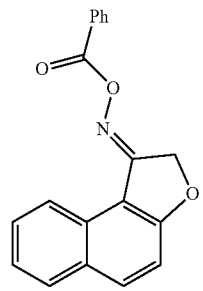

PI-7

PI-8

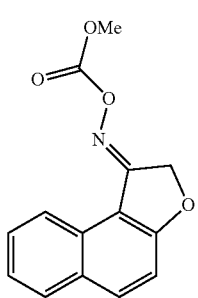

PI-9

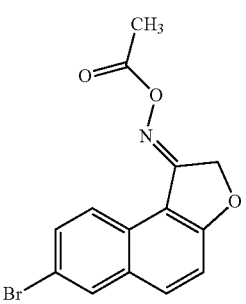

PI-10

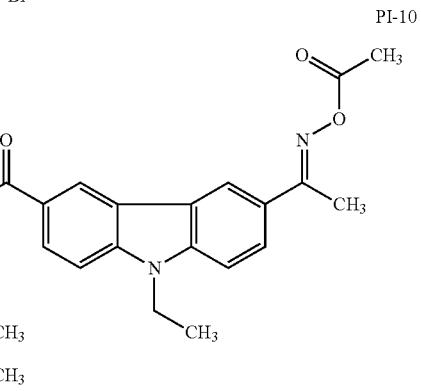

Specific examples of the organic halogenated compounds include compounds described in Wakabayashi, et. al., "Bull Chem. Soc. Japan" 42, 2924 (1969), U.S. Pat. No. 3,905, 815, JP-B No. S46-4605, JP-A No. S48-36281, JP-A No. S55-32070, JP-A No. S60-239736, JP-A No. S61-169835, JP-A No. S61-169837, JP-A No. S62-58241, JP-A No. S62-212401, JP-A No. S63-70243, JP-A No. S63-298339, and M. P. Hutt, et al., "Journal of Heterocyclic Chemistry", 7, 511 (1970); and particularly, trihalomethyl group-substituted oxazole compounds and s-triazine compounds.

Examples of the hexaarylbiimidazole compound include various types of compounds described in respective specifications of JP-B No. H6-29285, U.S. Pat. Nos. 3,479,185, 4,311,783, 4,622,286, and the like.

Examples of the acylphosphine oxide compound include monoacylphosphine oxide compounds, and bisacylphosphine oxide compounds. Specific examples thereof include IRGACURE 819, DAROCUR 4265, and DAROCUR TPO, manufactured by BASF.

The photopolymerization initiator can be used singly, or in combination of two or more kinds thereof.

The total amount of the photopolymerization initiator in the photosensitive composition of the present disclosure is preferably from 0.05 to 30 parts by mass, more preferably from 0.1 to 20 parts by mass, yet more preferably from 0.1 to 10 parts by mass, and particularly preferably from 0.1 to 5 parts by mass, with respect to 100 parts by mass of the total solid content in the photosensitive composition.

<Sensitizer>

The photosensitive composition of the present disclosure may include a sensitizer, in addition to the photopolymerization initiator.

The sensitizer is a compound which shifts to an excited state by absorbing actinic radiation or radioactive rays. The sensitizer in an excited state is capable of facilitating actions such as electron transfer, energy transfer, and heat generation due to an interaction with the photopolymerization initiator, thereby initiating and/or accelerating the polymerization.

Examples of typical sensitizers which can be used in the present disclosure include compounds disclosed in Crivello [J. V. Crivello, Adv. in Polymer Sci., 62, 1 (1984)]. Specific examples thereof include pyrene, perylene, acridine orange, thioxanthene, 2-chlorothioxanthone, benzoflavine, N-vinylcarbazole, 9,10-dibutoxyanthracene, anthraquinone, cumarin, ketocoumarin, phenanthrene, camphorquinone, and phenothiazine derivatives. The sensitizer is preferably added to the photosensitive composition at a ratio of from 50 to 200% by mass with respect to the amount of the photopolymerization initiator.

<Silica Particles>

The photosensitive composition of the present disclosure preferably includes silica particles. Incorporation of silica particles allows the resulting cured product to have an excellent adhesion and hardness.

The silica particles used in the present disclosure preferably have an average primary particle size of from 1 to 200 nm, more preferably from 1 to 100 nm, yet more preferably from 1 to 50 nm, and particularly preferably from 1 to 30 nm. The average primary particle size refers to an arithmetic mean of the values of the particle size obtained by measuring arbitrary 200 particles by an electron microscope. In a case in which the shape of the particles is not spherical, the largest diameter of the outer diameters thereof is taken as the particle size of the particles.

Further, the silica particles preferably have a porosity of less than 10%, more preferably less than 3%, and particularly preferably has no cavity, from the viewpoint of the hardness of the resulting cured product. The porosity of the particles is an arithmetic mean of the values of the ratio, of an area of the cavities in a particle to the area of the entire particle as observed in a cross sectional image obtained by an electron microscope, in 200 particles.

As the silica particles, any particles of an inorganic oxide containing silicon dioxide can be used without problem. The silica particles are preferably particles containing silicon oxide or a hydrate thereof as a main component (preferably, in an amount of 80% by mass or more). The above described particles may contain an aluminate as a minor component (for example, in an amount of less than 5% by mass). Examples of the aluminate which may be contained as a minor component include sodium aluminate and potassium aluminate.

Further, silica particles may also contain an inorganic salt such as sodium hydroxide, potassium hydroxide, lithium hydroxide, or ammonium hydroxide; or an organic salt such as tetramethylammonium hydroxide. Examples of such silica include colloidal silica.

A dispersion medium for colloidal silica is not particularly limited, and the dispersion medium may be any of water, an organic solvent, or a mixture thereof. The dispersion medium may be used singly, or in combination of two or more kinds thereof.

In the present disclosure, particles can also be used as a dispersion liquid prepared by mixing and dispersing the particles in a suitable dispersant and solvent, using a mixing apparatus such as a ball mill, rod mill or the like. Note, however, that in a case in which colloidal silica is used to introduce silica particles into the photosensitive composition of the present disclosure, it does not mean that the colloidal silica is present in a colloidal state, also in the composition.

The photosensitive composition may contain only one kind of the silica particles, or two or more kinds thereof.

From the viewpoint of adhesion and hardness, the content of the silica particles is preferably 5% by mass or more, more preferably 10% by mass or more, and particularly preferably 20% by mass or more, with respect to the total solid content of the photosensitive composition. At the same time, the content of the silica particles is preferably 80% by mass or less, more preferably 60% by mass or less, yet more preferably 50% by mass or less, and particularly preferably less than 40% by mass.

<At Least One Heterocyclic Compound Selected from Group Consisting of Triazole Compound, Tetrazole Compound, Thiadiazole Compound, Triazine Compound, Rhodanine Compound, Benzothiazole Compound and Benzimidazole Compound>

The photosensitive composition of the present disclosure includes at least one heterocyclic compound (hereinafter, also referred to as a "specific heterocyclic compound") selected from the group consisting of a triazole compound, a tetrazole compound, a thiadiazole compound, a triazine compound, a rhodanine compound, a benzothiazole compound and a benzimidazole compound. It is assumed that the incorporation of the specific heterocyclic compound, the silica particles and a maleimide compound into the photosensitive composition of the present disclosure allows the resulting cured product to have an excellent adhesion and corrosion prevention performance on a metal wiring, as well as an excellent transparency and hardness.

The specific heterocyclic compound is not particularly limited as long as the compound contains a triazole ring structure, a tetrazole ring structure, a thiadiazole ring structure, a triazine ring structure, a rhodanine ring structure, a benzothiazole ring structure and/or a benzimidazole ring structure. However, the specific heterocyclic compound is preferably a compound represented by any one of the following Formula D1 to Formula D11.

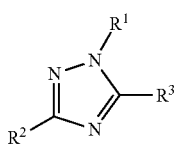

Formula D1

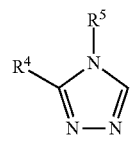

Formula D2

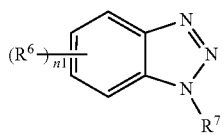

Formula D3

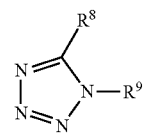

Formula D4

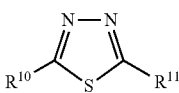

Formula D5

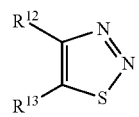

Formula D6

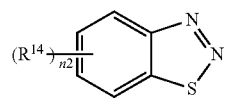

Formula D7

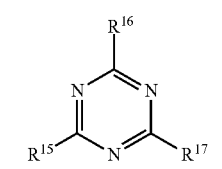

Formula D8

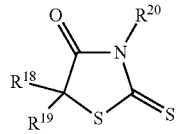

Formula D9

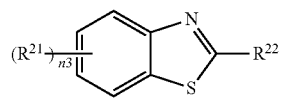

Formula D10

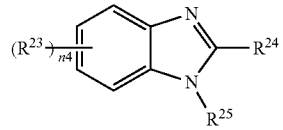

Formula D11

In Formula D1 to Formula D11, each of $R^1$, $R^5$, $R^7$, $R^9$, $R^{20}$ and $R^{25}$ independently represents a hydrogen atom, an alkyl group, an aryl group, an heteroaryl group or an amino group; each of $R^2$ to $R^4$, $R^8$, $R^{10}$ to $R^{13}$, $R^{15}$ to $R^{18}$, $R^{22}$ and $R^{24}$ independently represents a hydrogen atom, an alkyl group, an aryl group, a heteroaryl group, an amino group, an alkylamino group, an arylamino group, a dialkylamino group, a diarylamino group, an alkylarylamino group, a mercapto group, an alkylthio group or an arylthio group; each of $R^6$, $R^{14}$, $R^{21}$ and $R^{23}$ independently represents a halogen atom, an alkyl group, an aryl group, a heteroaryl group, an amino group, an alkylamino group, an arylamino group, a dialkylamino group, a diarylamino group, an alkylarylamino group, a mercapto group, an alkylthio group, an arylthio group, a hydroxy group, an alkoxy group or an aryloxy group; $R^{19}$ represents a hydrogen atom, an alkyl group, an aryl group or a heteroaryl group; and each of n1 to n4 independently represents an integer from 0 to 4.

A compound represented by each of the Formula D1 to Formula D3 is a triazole compound; a compound represented by the Formula D4 is a tetrazole compound; a compound represented by each of the Formula D5 to Formula D7 is a thiadiazole compound; a compound represented by the Formula D8 is a triazine compound; a compound represented by the Formula D9 is a rhodanine compound; a compound represented by the Formula D10 is a benzothiazole compound, and a compound represented by the Formula D11 is a benzimidazole compound.

In the above Formulas, each of $R^1$, $R^7$, $R^9$, $R^{20}$ and $R^{25}$ preferably independently represents a hydrogen atom, an alkyl group, an aryl group or a heteroaryl group, more preferably a hydrogen atom or an alkyl group, and particularly preferably a hydrogen atom.

$R^5$ is preferably a hydrogen atom, an alkyl group or an amino group, and more preferably a hydrogen atom or an amino group.

Each of $R^2$ to $R^4$, $R^8$, $R^{10}$ to $R^{13}$, $R^{22}$ and $R^{24}$ preferably independently represents a hydrogen atom, an alkyl group, an aryl group, a heteroaryl group, an amino group, a mercapto group or an alkylthio group, and more preferably a hydrogen atom, an amino group, a mercapto group or an alkylthio group.

Each of $R^1$ to $R^{17}$ preferably independently represents a hydrogen atom, an alkyl group, an aryl group, a heteroaryl group, an amino group, a mercapto group or an alkylthio group, more preferably an amino group or a heteroaryl group, and particularly preferably an amino group or a pyridyl group.

From the viewpoint of synthesis, $R^{15}$ to $R^{17}$ are preferably the same group.

$R^{18}$ is preferably a hydrogen atom, an alkyl group, an aryl group, a heteroaryl group, an amino group, a mercapto group or an alkylthio group, more preferably a hydrogen atom, an amino group, a mercapto group or an alkylthio group, and yet more preferably a hydrogen atom.

Each of $R^6$, $R^{14}$, $R^{21}$ and $R^{23}$ preferably independently represents an alkyl group, an aryl group, a heteroaryl group, an amino group, a mercapto group, an alkylthio group, an arylthio group, a hydroxy group, an alkoxy group or an aryloxy group, and more preferably an alkyl group, an aryl group, a heteroaryl group, an amino group, a mercapto group, an alkylthio group or an arylthio group.

Further, each of $R^6$, $R^{14}$, $R^{21}$ and $R^{23}$ is capable of substituting a hydrogen atom present at an arbitrary position on the benzene ring in each of the above Formulae, to bind to the benzene ring.

$R^{19}$ is preferably a hydrogen atom or an alkyl group, and more preferably a hydrogen atom.

Each of n1 to n4 preferably independently represents an integer from 0 to 2, more preferably 0 or 1, and particularly preferably 0.

The specific heterocyclic compound is preferably at least one heterocyclic compound selected from the group consisting of a triazole compound, a tetrazole compound, a thiadiazole compound, a triazine compound, a rhodanine compound, a benzothiazole compound and a benzimidazole compound, more preferably at least one heterocyclic compound selected from the group consisting of a tetrazole compound, a thiadiazole compound, a rhodanine compound, a benzothiazole compound and a benzimidazole compound, and yet more preferably at least one heterocyclic compound selected from the group consisting of a tetrazole compound and a thiadiazole compound, from the viewpoint of adhesion. Further, the specific heterocyclic compound is preferably a compound represented by any one of the Formula D1, Formula D2, and Formula D4 to Formula D11, more preferably a compound represented by any one of the Formula D4 to Formula D11, yet more preferably a compound represented by any one of the Formula D4 to Formula D7, and Formula D9 to Formula D11, and particularly preferably a compound represented by any one of the Formula D4 to Formula D7, from the viewpoint of adhesion.

From the viewpoint of corrosion prevention performance on a metal wiring, the specific heterocyclic compound is preferably at least one heterocyclic compound selected from the group consisting of a thiadiazole compound and a triazine compound, and more preferably a thiadiazole compound. Further, the specific heterocyclic compound is preferably a compound represented by any one of the Formula D5 to Formula D8, more preferably a compound represented by any one of the Formula D5, Formula D6 and Formula D8, and yet more preferably a compound represented by the Formula D5 or a compound represented by the Formula D6, and particularly preferably a compound represented by the Formula D6, from the viewpoint of corrosion prevention performance on a metal wiring.

Specific preferred examples of the heterocyclic compound include compounds shown below.

Examples of the triazole compound include the following compounds.

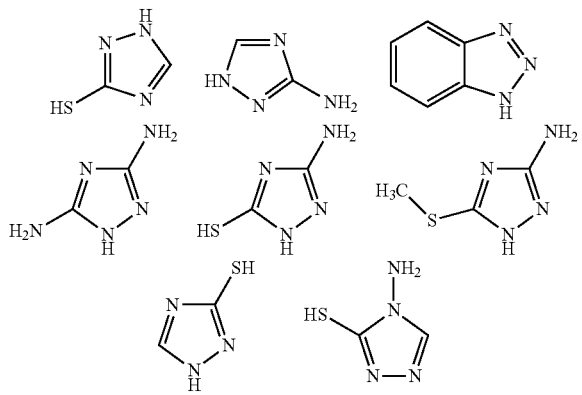

Examples of the tetrazole compound include the following compounds.

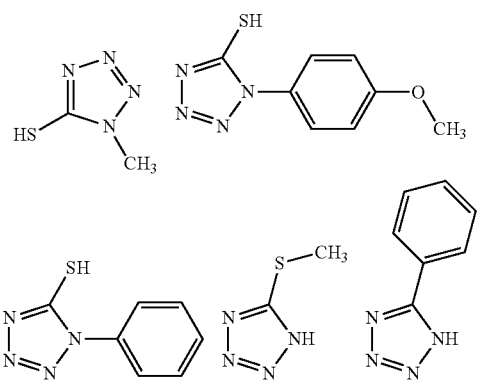

Examples of the thiadiazole compound include the following compounds.

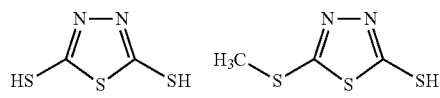

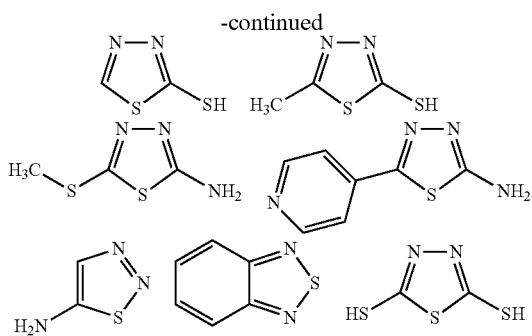

Examples of the triazine compound include the following compounds.

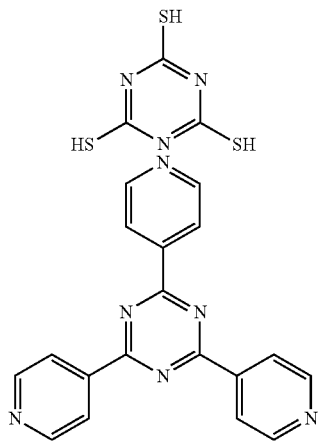

Examples of the rhodanine compound include the following compounds.

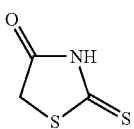

Examples of the benzothiazole compound and the benzimidazole compound include the following compounds.

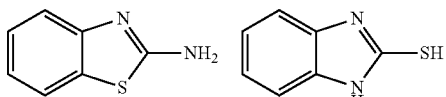

The specific heterocyclic compound may be included singly, or two or more kinds thereof may be included.

The content of the specific heterocyclic compound in the photosensitive composition of the present disclosure is not particularly limited. However, the content is preferably from 0.1 to 20% by mass, more preferably from 0.2 to 10% by mass, yet more preferably from 0.5 to 8% by mass, and particularly preferably from 1 to 5% by mass, with respect to the total solid content of the photosensitive composition. When the content of the compound is within the above range, the resulting cured product has a more excellent adhesion and corrosion prevention performance on a metal wiring.

<Maleimide Compound>

The photosensitive composition of the present disclosure includes a maleimide compound.

The maleimide compound is not particularly limited as long as the compound contains one or more groups represented by the following Formula E. However, the maleimide compound is preferably a compound containing two or more groups represented by the following Formula E, and more preferably a compound containing two or more maleimide groups.

In the present disclosure, the compound containing two or more groups represented by the following Formula E is defined as a maleimide compound, and not encompassed in the above described compound having two or more ethylenically unsaturated bonds.

Formula E

In Formula E, $Y^1$ represents —CH=CH—, —C(CH$_3$)=CH—, —C(=CH$_2$)—CH$_2$—, or —C(CH$_3$)=C(CH$_3$)—, and a waved line represents a binding site with another structure.

$Y^1$ is preferably —CH=CH—, —C(CH$_3$)=CH— or —C(=CH$_2$)—CH$_2$—, more preferably —CH=CH— or —C(CH$_3$)=CH—, and particularly more preferably —CH=CH—.

The number of the groups represented by the Formula E in the maleimide compound is preferably from 1 to 20, more preferably from 1 to 10, yet more preferably from 2 to 8, and particularly preferably 2.

From the view point of the stability of the compound and the composition, it is preferable that, in the maleimide compound, a nitrogen atom in a group represented by the Formula E is directly bound to an aromatic ring.

Further, from the viewpoint of adhesion and corrosion prevention performance, the maleimide compound preferably includes a compound containing two of the groups represented by the above Formula E, namely, a bismaleimide compound, and more preferably a compound represented by the following Formula E1.

Formula E1

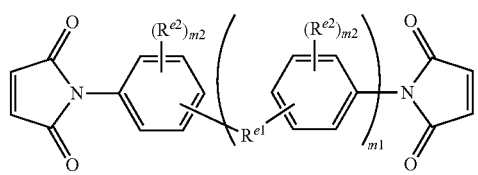

In Formula E1, each of $R^{e1}$s independently represents a single bond, an alkylene group, —SO$_2$—, —SO—, —S— or —O—; each of $R^{e2}$s independently represents a halogen atom or an alkyl group; m1 represents an integer from 0 to 5; and each of m2s independently represents an integer from 0 to 4.

Each of $R^{e1}$s preferably independently represents a single bond, an alkylene group having from 1 to 8 carbon atoms, or —O—, more preferably a single bond, an alkylene group having from 1 to 3 carbon atoms, or —O—, and yet more preferably a single bond, a methylene group, a dimethylmethylene group (2,2-propylene group), or —O—.

Each of $R^{e2}$s preferably independently represents an alkyl group, more preferably an alkyl group having from 1 to 8 carbon atoms, and yet more preferably a methyl group or an ethyl group.

Further, each of $R^{e1}$s and $R^{e2}$s is capable of substituting a hydrogen atom present at an arbitrary position on a benzene ring in the above Formula E1, to bind to the benzene ring.

In addition, each of $R^{e1}$s is preferably bound to a maleimide group, or to a group having a maleimide group, at the p-position of a benzene ring in the Formula E1.

m1 preferably represents an integer from 1 to 5, more preferably an integer from 2 to 5, and yet more preferably an integer from 3 to 5.

Each of m2s preferably independently represents an integer from 0 to 2.

Specific preferred examples of the maleimide compound include the following compounds.

1,6-bismaleimide-(2,4,4-trimethyl)hexane, N,N'-decamethylene bismaleimide, N,N'-octamethylene bismaleimide, N,N'-hexamethylene bismaleimide, N,N'-trimethylene bismaleimide, bis[(2,5-dioxo-2,5-dihydropyrrol-1-yl)methyl]bicyclo[2.2.1]heptane, 4,4'-diphenyl ether bismaleimide, 4,4'-diphenylsulfone bismaleimide, 4,4'-diphenylsulfide bismaleimide, 3,3'-dimethyl-4,4'-diphenylmethane bismaleimide, 1,3-bis(3-maleimidephenoxy)benzene, 1,3-bis(4-maleimidephenoxy)benzene, 1,3-bis(3-maleimidephenoxy)benzene, 3,3',5,5'-tetramethyl-4,4'-diphenylmethane bismaleimide, 3,3'-diethyl-4,4'-diphenylmethane bismaleimide, 3,3'-di-n-butyl-4,4'-diphenylmethane bismaleimide, and 3,3',5,5'-tetraethyl-4,4'-diphenylmethane bismaleimide.

The maleimide compound may be included singly, or two or more kinds thereof may be included.

The content of the maleimide compound in the photosensitive composition of the present disclosure is not particularly limited. However, the content is preferably from 0.1 to 20% by mass, more preferably from 0.5 to 15% by mass, yet more preferably from 1 to 10% by mass, and particularly

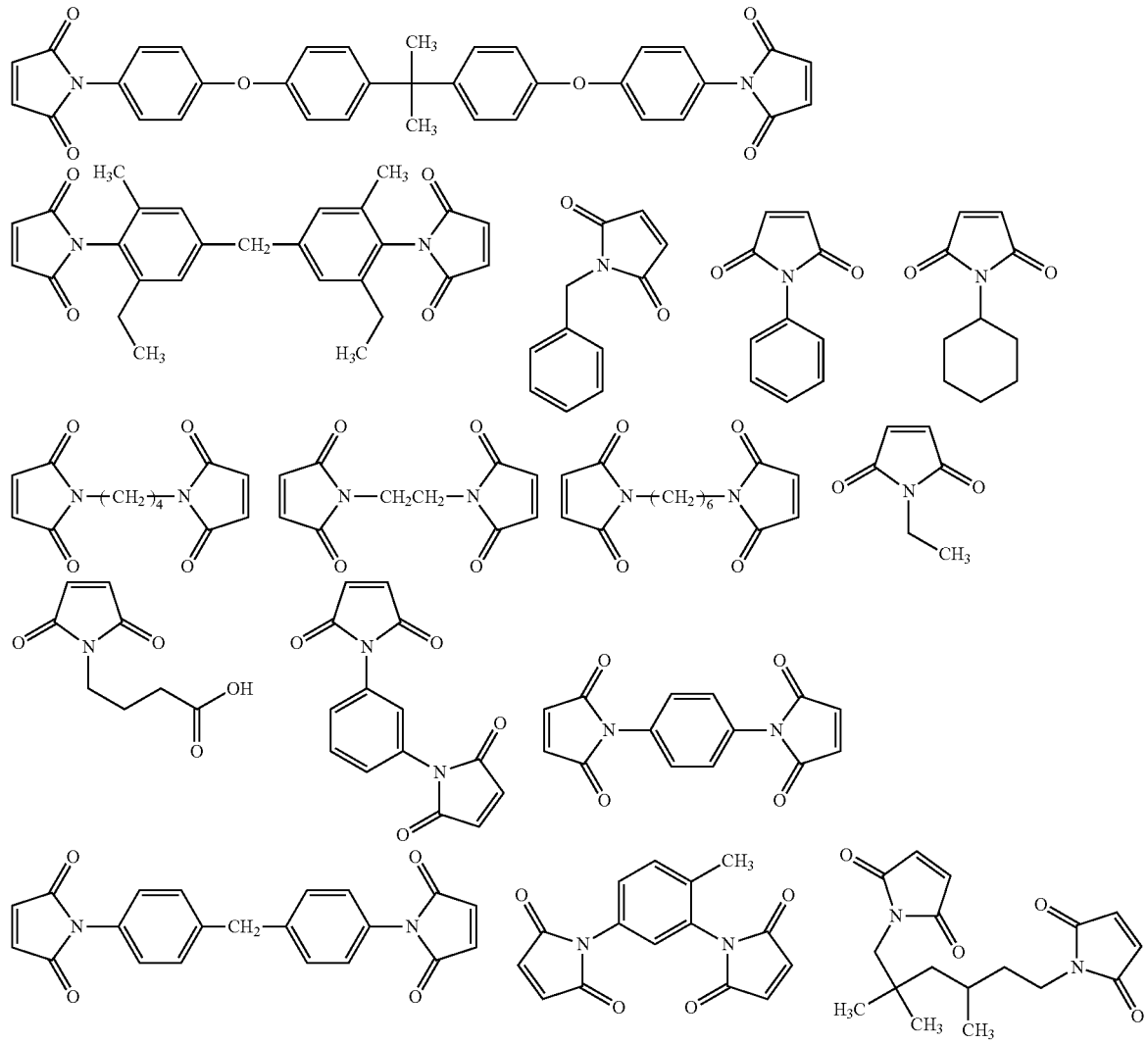

Further, specific examples of the maleimide compound include the following bismaleimide compound, such as:

preferably from 3 to 8% by mass, with respect to the total solid content of the photosensitive composition. When the content of the maleimide compound is within the above range, the resulting cured product has a more excellent adhesion and corrosion prevention performance on a metal wiring.

<Solvent>

The photosensitive composition of the present disclosure includes a solvent.

The photosensitive composition of the present disclosure is preferably prepared as a liquid in which each of the components are dissolved and/or dispersed in a solvent.

The solvent is preferably an organic solvent.

Examples of the solvent include ethylene glycol monoalkyl ethers, ethylene glycol dialkyl ethers, ethylene glycol monoalkyl ether acetates, propylene glycol monoalkyl ethers, propylene glycol dialkyl ethers, propylene glycol monoalkyl ether acetates, diethylene glycol dialkyl ethers, diethylene glycol monoalkyl ether acetates, dipropylene glycol monoalkyl ethers, butylene glycol diacetates, dipropylene glycol dialkyl ethers, dipropylene glycol monoalkyl ether acetates, alcohols, esters, ketones, amides, and lactones. Specific examples of these solvents can be found in paragraph 0062 in JP-A No. 2009-098616.

Specifically, the solvent is preferably at least one solvent selected from the group consisting of propylene glycol monomethyl ether acetate, diethylene glycol diethyl ether, diethylene glycol ethyl methyl ether, propylene glycol monomethyl ether, 1,3-butylene glycol diacetate, cyclohexanol acetate, propylene glycol diacetate, and tetrahydrofurfuryl alcohol.

The solvent preferably has a boiling point of from 100° C. to 300° C., and more preferably from 120° C. to 250° C., from the viewpoint of coating properties.

The solvent which can be used in the present disclosure can be used singly, or in combination of two or more kinds thereof. The use of solvents having different boiling points in combination is also preferred.

The content of the solvent in the photosensitive composition of the present disclosure is preferably from 100 to 3,000 parts by mass, more preferably from 200 to 2,000 parts by mass, and yet more preferably from 250 to 1,000 parts by mass, per 100 parts by mass of the total solid content of the photosensitive composition, from the viewpoint of adjusting a viscosity of the composition to the viscosity suitable for coating.

The photosensitive composition preferably has a solid concentration of from 3 to 50% by mass, and more preferably from 10 to 40% by mass.

The photosensitive composition preferably has a viscosity of from 1 to 200 mPa·s, more preferably from 2 to 100 mPa·s, and most preferably from 3 to 80 mPa·s. The viscosity is preferably measured at 25±0.2° C., using a rotational viscometer, model RE-80L, manufactured by Toki Sangyo Co., Ltd. The measurement is preferably carried out at a rotational speed of 100 rpm when the viscosity is less than 5 mPa·s, at 50 rpm when the viscosity is 5 mPa·s or more but less than 10 mPa·s, at 20 rpm when the viscosity is 10 mPa·s or more but less than 30 mPa·s, and at 10 rpm when the viscosity is 30 mPa·s or more.

<Copolymer Containing Acid Group>

The photosensitive composition of the present disclosure may include a copolymer containing an acid group, from the viewpoint of improving resolution and film properties. The copolymer containing an acid group does not include two or more ethylenically unsaturated bonds.

Preferred examples of the acid group include carboxyl group.

The copolymer containing an acid group is not particularly limited, and any known copolymer containing an acid group can be used. However, a copolymer (linear organic polymer) containing a linear acid group is preferably used. As the linear organic polymer, a known linear organic polymer can be used arbitrarily. Preferably, a linear organic polymer soluble or swellable in water or weakly alkaline water is selected, so that the photosensitive composition can be developed with water or weakly alkaline water. The linear organic polymer is selected and used depending on the application not only as a film-forming agent, but also as a developer for water, weakly alkaline water, or an organic solvent. For example, when a water-soluble organic polymer is used, it is possible to carry out development with water. Examples of such a linear organic polymer include radical polymers containing a carboxylic acid group in its side chain, such as those disclosed in JP-A No. S59-44615, JP-B No. S54-34327, JP-B No. S58-12577, JP-B No. S54-25957, JP-A No. S54-92723, JP-A No. S59-53836, and JP-A No. S59-71048, namely, resins obtained by homopolymerization or copolymerization of a monomer containing a carboxyl group; resins obtained by homopolymerization or copolymerization of a monomer containing an acid anhydride, followed by hydrolysis, half-esterification or half-amidation of the resulting anhydride units; and epoxy acrylates obtained by modification of an epoxy resin with an unsaturated monocarboxylic acid and an acid anhydride. Examples of the monomer containing a carboxyl group include acrylic acid, methacrylic acid, itaconic acid, crotonic acid, maleic acid, fumaric acid, and 4-carboxystyrene. Examples of the monomer containing an acid anhydride include maleic anhydride.

Other examples include acidic cellulose derivatives which contains a carboxyl group in its side chain. In addition to the above, a polymer containing a hydroxyl group to which a cyclic acid anhydride is added is also useful.

The copolymer containing an acid group may be contained singly, or two or more kinds thereof may be contained.

In a case in which the photosensitive composition of the present disclosure includes the copolymer containing an acid group, the content of the copolymer containing an acid group is not particularly limited. However, the content is preferably from 1 to 70% by mass, more preferably from 2 to 50% by mass, yet more preferably from 5 to 30% by mass, with respect to the total solid content of the photosensitive composition.

<Alkoxysilane Compound>

The photosensitive composition of the present disclosure preferably includes an alkoxysilane compound. The use of an alkoxysilane compound serves to improve the adhesion between a substrate and a film formed by the photosensitive composition of the present disclosure.

The alkoxysilane compound is not particularly limited as long as the compound contains at least one alkoxy group to which a silicon atom is directly bound. However, the alkoxysilane compound is preferably a compound containing a dialkoxysilyl group and/or a trialkoxysilyl group, and more preferably a compound containing a trialkoxysilyl group.

The alkoxysilane compound which can be used in the photosensitive composition of the present disclosure is preferably a compound which improves the adhesion between a base material, for example, a silicon compound such as silicon, silicon oxide, or silicon nitride, or a metal such as gold, copper, molybdenum, titanium or aluminum, and a cured film. Specifically, a known silane coupling agent or the like is also effective. A silane coupling agent containing an ethylenically unsaturated bond is preferred.

Examples of the silane coupling agent include γ-aminopropyltrimethoxysilane, γ-aminopropyltriethoxysilane, γ-glycidoxypropyltrialkoxysilane, γ-glycidoxypropyldialkoxysilane, γ-methacryloxypropyltrialkoxysilane, γ-methacryloxypropyldialkoxysilane, γ-chloropropyltrialkoxysilane, γ-mercaptopropyltrialkoxysilane, β-(3,4-epoxycyclohexyl)ethyltrialkoxysilane, and vinyltrialkoxysilane. Of these, γ-methacryloxypropyltrialkoxysilane, γ-acryloxypropyltrialkoxysilane, vinyltrialkoxysilane, and/or γ-glycidoxypropyltrialkoxysilane is/are more preferred. These compounds may be used singly, or in combination of two or more kinds thereof.

Examples of commercially available products thereof include KBM-403 and KBM-5103, manufactured by Shin-Etsu Chemical Co., Ltd.

The photosensitive composition may contain only one kind of the alkoxysilane compound, or two or more kinds thereof.

The content of the alkoxysilane compound in the photosensitive composition of the present disclosure is preferably from 0.1 to 30% by mass, more preferably from 2 to 20% by mass, and yet more preferably from 2 to 15% by mass, with respect to the total solid content of the photosensitive composition. In a case in which the photosensitive composition contains two or more kinds of the alkoxysilane compounds, it is preferable that the total content thereof falls within the above range.

<Polymerization Inhibitor>

The photosensitive composition of the present disclosure preferably includes a polymerization inhibitor. Incorporation of the polymerization inhibitor serves to inhibit a polymerization reaction due to leaking light, and to impart an excellent developability to the composition.

A polymerization inhibitor is a substance which performs hydrogen donation (giving of hydrogen), energy donation (giving of energy), and/or electron donation (giving of electron(s)) to a polymerization initiating radical generated from the polymerization initiator by light or heat, thereby serving to inactivate the polymerization initiating radical, and to inhibit the initiation of polymerization. For example, compounds described in paragraphs 0154 to 0173 in JP-A No. 2007-334322 can be used.

A polymerization inhibitor which is hard-tone and which does not cause a decrease in sensitivity is preferably used. Examples of such a polymerization inhibitor include: phenothiazine derivatives such as phenothiazine, chlorpromazine, levomepromazine, fluphenazine, and thioridazine; phenoxazine derivatives such as phenoxazine, 3,7-bis(diethylamino)phenoxazine-5-ium perchlorate, 5-amino-9-(dimethylamino)-10-methylbenzo[a]phenoxazine-7-ium chloride, 7-(pentyloxy)-3H-phenoxazine-3-one, 5,9-diaminobenzo[a]phenoxazine-7-iumacetate, and 7-ethoxy-3H-phenoxazine-3-one; stable radicals such as tri-p-nitrophenylmethyl, diphenylpicrylhydrazyl, and galvinoxyl; quinones such as quinone, benzoquinone, chlorobenzoquinone, 2,5-dichlorobenzoquinone, 2,6-dichlorobenzoquinone, 2,3-dimethylbenzoquinone, 2,5-dimethylbenzoquinone, methoxybenzoquinone, methylbenzoquinone, tetrabromobenzoquinone, tetrachlorobenzoquinone, tetramethylbenzoquinone, trichlorobenzoquinone, trimethylbenzoquinone, amylquinone, amyloxyhydroquinone, 2,5-di-t-butylhydroquinone, and 2,5-diphenyl-p-benzoquinone; naphthols such as α-naphthol, 2-nitro-1-naphthol, β-naphthol, and 1-nitro-2-naphthol; phenols such as 4-methoxyphenol, 4-ethoxyphenol, hydroquinone, phenol, t-butylcatechol, methylhydroquinone, n-butylphenol, hydroquinone monopropyl ether, t-butylcresol, p-cresol, 2,6-di-t-butyl-p-cresol, catechol resorcin, o-t-butylphenol, 2,6-di-p-methoxyphenol, 2,6-di-t-butylphenol, 2,4-di-t-butylphenol, 3,5-di-t-butylphenol, 3,5-di-t-butyl-4-hydroxybenzoic acid, N,N'-bis-3-(3',5'-di-t-butyl-4-hydroxyphenyl)propionylhexamethylenediamine, 2,2'-methylenebis(6-t-butyl-p-cresol), n-octadecyl-3-(4-hydroxy-3',5'-di-t-butylphenyl)propionate, distearyl(4-hydroxy-3-methyl-5-t-butyl)benzyl malonate, 2,4,6-tri-t-butylphenol, 1,6-hexanediol bis[3-(3,5-di-t-butyl-4-hydroxyphenyl)propionate], triethylene glycol bis[3-(3-t-butyl-5-methyl-4-hydroxyphenyl)propionate], 2,2-thiodiethylene bis[3-(3,5-di-t-butyl-4-hydroxyphenyl)propionate], 3,9-bis[1,1-dimethyl-2-[β-(3-t-butyl-4-hydroxy-5-methylphenyl)propionyloxyethyl-2,4,8,10-tetraoxaspiro[5.5]undecane, 2,2'-ethylidenebis(2,4-di-t-butylphenol), 1,1,3-tris(2-methyl-4-hydroxy-5-t-butylphenylbutane, 1,3,5-trimethyl-2,4,6-tris(3,5-di-t-butyl-4-hydroxybenzyl)benzene, tris(3,5-di-t-butyl-4-hydroxybenzyl)isocyanate, tris[2-(3',5'-di-t-butyl-4'-hydroxyhydrocinnamoyl oxy)ethyl]isocyanate, tris(4-t-butyl-2,6-dimethyl-3-hydroxybenzyl)isocyanate, and tetrakis[methylene-3-(3',5'-di-t-butyl-4'-hydroxyphenyl)propionate]methane; nitrophenols such as 2,4-dinitrophenol, o-nitrophenol, m-nitrophenol, and p-nitrophenol; gallic acids such as gallic acid, methyl gallate, propyl gallate, and isoamyl gallate; pigments such as methylene blue, and malachite green; amines such as β-naphthylamine, N-nitrosocyclohexylamine salt, and di-p-fluorophenylamine; pyrogallol, monobenzyl ether, benzoquinone, triphenylphosphine, cuprous chloride, phenothiazine, chloranil, pyridine, nitrobenzene, dinitrobenzene, p-toluidine, picric acid, and methyl salicylate.

Particularly preferred examples of the polymerization inhibitor include at least one selected from the group consisting of phenothiazine, phenoxazine, hindered amines and derivatives thereof.

Examples of phenothiazine and derivatives thereof include phenothiazine, bis(α-methylbenzyl)phenothiazine, 3,7-dioctylphenothiazine, bis(α-dimethylbenzyl)phenothiazine, fluphenazine, and thioridazine. Of these, phenothiazine is preferred.

Examples of phenoxazine and derivatives thereof include phenoxazine, 3,7-bis(diethylamino)phenoxazine-5-ium perchlorate, 5-amino-9-(dimethylamino)-10-methylbenzo[a]phenoxazine-7-ium chloride, 7-(pentyloxy)-3H-phenoxazine-3-one, 5,9-diaminobenzo[a]phenoxazine-7-ium acetate, and 7-ethoxy-3H-phenoxazine-3-one. Of these, phenoxazine is preferred.

Examples of hindered amines and derivatives thereof include CHIMASSORB 2020 FDL, TINUVIN 144, TINUVIN 765, and TINUVIN 770 (all manufactured by BASF JAPAN LTD.). Of these, TINUVIN 144 is preferred.

The polymerization inhibitor may be included singly, or two or more kinds thereof may be included.

The content of the polymerization inhibitor in the photosensitive composition of the present disclosure is not particularly limited. However, the content is preferably from 0.005 to 0.5% by mass, more preferably from 0.01 to 0.5% by mass, with respect to the total solid content of the photosensitive composition. By adjusting the amount of the polymerization inhibitor to be included in the composition, a patternability of the composition can be improved without compromising the sensitivity.

<Surfactant>

The photosensitive composition of the present disclosure may include a surfactant.

As the surfactant, any of an anionic, cationic, nonionic, or amphoteric surfactant can be used. However, a nonionic surfactant is preferred. The surfactant is preferably a nonionic surfactant, and more preferably a fluorochemical surfactant.

Examples of the surfactant which can be used in the present disclosure include commercially available products such as: MEGAFACE F-142D, MEGAFACE F-172, MEGAFACE F-173, MEGAFACE F-176, MEGAFACE F-177, MEGAFACE F-183, MEGAFACE F-479, MEGAFACE F-482, MEGAFACE F-554, MEGAFACE F-780, MEGAFACE F-781, MEGAFACE F-781-F, MEGAFACE R-30, MEGAFACE R-08, MEGAFACE F-472SF, MEAFACE BL-20, MEGAFACE R-61, and MEGAFACE R-90 (manufactured by DIC Corporation); FLUORAD FC-135, FLUORAD FC-170C, FLUORAD FC-430, FLUORAD FC-431, and NOVEC FC-4430 (manufactured by 3M Japan Limited); ASAHIGUARD AG-7105, AG-7000, AG-950, AG-7600, SURFLON S-112, SURFLON S-113, SURFLON S-131, SURFLON S-141, SURFLON S-145, SURFLON S-382, SURFLON SC-101, SURFLON SC-102, SURFLON SC-103, SURFLON SC-104, SURFLON SC-105, and SURFLON SC-106 (manufactured by Asahi Glass Co. Ltd.); EFTOP EF351, EFTOP EF352, EFTOP EF801, and EFTOP EF802 (manufactured by Mitsubishi Materials Electronic Chemicals Co., Ltd.); and FTERGENT 250 (manufactured by NEOS COMPANY LIMITED). In addition to the above, examples of the surfactant also include commercially available products such as: KP series (manufactured by Shin-Etsu Chemical Co., Ltd.); POLYFLOW series (manufactured by Kyoeisha Chemical Co. Ltd.); EFTOP series (manufactured by Mitsubishi Materials Electronic Chemicals Co., Ltd.); MEGAFACE series (manufactured by DIC Corporation); FLUORAD series (manufactured by 3M Japan Limited); ASAHIGUARD and SURFLON series (manufactured by Asahi Glass Co. Ltd.), and POLYFOX series (manufactured by OMNOVA Solutions Inc.).

Further, preferred examples of the surfactant include a copolymer which contains a constituent unit A and a constituent unit B represented by the following Formula W, and which has a weight average molecular weight (Mw) in terms of polystyrene, as measured by gel permeation chromatography using tetrahydrofuran as a solvent, of from 1,000 to 10,000.

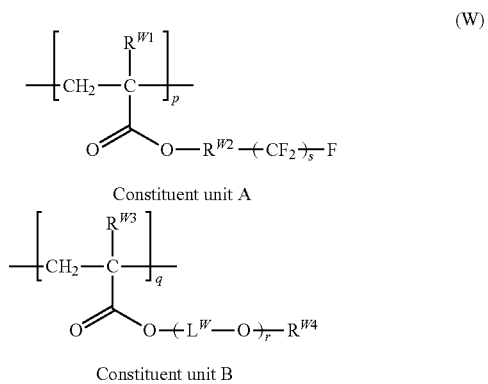

(W)

Constituent unit A

Constituent unit B

In Formula W, each of $R^{W1}$ and $R^{W3}$ independently represents a hydrogen atom or a methyl group; $R^{W2}$ represents a straight chain alkylene group having from 1 to 4 carbon atoms; $R^{W4}$ represents a hydrogen atom or an alkyl group having from 1 to 4 carbon atoms; $L^W$ represents an alkylene group having from 3 to 6 carbon atoms; each of p and q represents a polymerization ratio in percentage by mass; p represents a numerical value of from 10% by mass to 80% by mass; q represents a numerical value of from 20% by mass to 90% by mass; r represents an integer from 1 to 18; and s represents an integer from 1 to 10.

The above described $L^W$ is preferably a branched alkylene group represented by the following Formula W-2. $R^{W5}$ in Formula W-2 represents an alkyl group having from 1 to 4 carbon atoms. From the viewpoint of compatibility and wettability to a face to be coated, $R^{W5}$ is preferably an alkyl group having from 1 to 3 carbon atoms, and more preferably an alkyl group having 2 or 3 carbon atoms.

The sum of p and q (p+q) in Formula W is preferably p+q=100, namely, 100% by mass.

The weight average molecular weight (Mw) of the above described copolymer is more preferably from 1,500 to 5,000.

(W-2)

In a case in which the photosensitive composition of the present disclosure includes a surfactant, the content of the surfactant is preferably from 0.001 to 5.0 parts by mass, and more preferably from 0.01 to 2.0 parts by mass, with respect to 100 parts by mass of the total solid content of the photosensitive composition.

The photosensitive composition may include only one kind of the surfactant, or two or more kinds thereof. When the photosensitive composition contains two or more kinds of the surfactants, it is preferable that the total content thereof falls within the above range.

<Other Components>
<<Compound Containing Epoxy Group, Compound Containing Oxetanyl Group, and Block Isocyanate Compound>>

The photosensitive composition of the present disclosure preferably includes at least one compound selected from the group consisting of a compound containing an epoxy group, a compound containing an oxetanyl group, and a block isocyanate compound. In such an embodiment, the resulting cured film has a more excellent hardness.

—Compound Containing Epoxy Group—

The photosensitive composition of the present disclosure may include a compound containing an epoxy group. The compound containing an epoxy group may contain only one epoxy group, but preferably contains two or more epoxy groups, in its molecule.

Specific examples of the compound containing two or more epoxy groups in its molecule include bisphenol A type epoxy resins, bisphenol F type epoxy resins, phenol novolac type epoxy resins, cresol novolac type epoxy resins and aliphatic epoxy resins.

These resins are available as commercial products. Examples of the bisphenol A type epoxy resin include JER827, JER828, JER834, JER1001, JER1002, JER1003, JER1055, JER1007, JER1009 and JER1010 (all manufactured by Mitsui Chemicals, Inc.); and EPICLON 860, EPICLON 1050, EPICLON 1051, and EPICLON 1055 (all manufactured by DIC Corporation). Examples of the bisphenol F type epoxy resin include JER806, JER807, JER4004, JER4005, JER4007, and JER4010 (all manufactured by Mitsui Chemicals, Inc.); EPICLON 830 and EPI-CLON 835 (both manufactured by DIC Corporation); and LCE-21, and RE-602S (both manufactured by Nippon Kayaku Co., Ltd.). Examples of the phenol novolac type epoxy resin include JER152, JER154, JER157S70, and JER157S65 (all manufactured by Mitsui Chemicals, Inc.); and EPICLON N-740, EPICLON N-740, EPICLON N-770, and EPICLON N-775 (all of the above, manufactured by DIC Corporation). Examples of the cresol novolac type epoxy resin include EPICLON N-660, EPICLON N-665, EPICLON N-670, EPICLON N-673, EPICLON N-680, EPICLON N-690, and EPICLON N-695 (all manufactured by DIC Corporation); and EOCN-1020 (manufactured by Nippon Kayaku Co., Ltd.). Examples of the aliphatic epoxy resin include ADEKA RESIN EP-4080S, ADEKA RESIN EP-4085S, and ADEKA RESIN EP-4088S (all manufactured by ADEKA CORPORATION); and CELLOXIDE 2021P, CELLOXIDE 2081, CELLOXIDE 2083, CELLOXIDE 2085, EHPE3150, EPOLEAD PB 3600, and EPOLEAD PB 4700 (all manufactured by Daicel Corporation). Other examples include, in addition to the above, ADEKA RESIN EP-4000S, ADEKA RESIN EP-4003 S, ADEKA RESIN EP-4010S, and ADEKA RESIN EP-4011S (all manufactured by ADEKA CORPORATION); and NC-2000, NC-3000, NC-7300, XD-1000, EPPN-501, and EPPN-502 (all manufactured by ADEKA CORPORATION).

Further, it is possible to suitably use the urethane compounds having an ethylene oxide skeleton described in JP-B No. S58-49860, JP-B No. S56-17654, JP-B No. S62-39417, and JP-B No. S62-39418, the contents of all of which are incorporated herein.

In a case in which the photosensitive composition of the present disclosure contains the compound containing an epoxy group, it is preferable that the compound is contained within a range of from 0.1 to 20% by mass, more preferably within a range of from 0.5 to 10% by mass, and yet more preferably within a range of from 1 to 5% by mass, with respect to the total solid content of the composition.

The photosensitive composition of the present disclosure may include only one kind of the compound containing an epoxy group, or two or more kinds thereof. When the photosensitive composition contains two or more kinds of the compound containing an epoxy group, it is preferable that the total content thereof falls within the above range.

—Compound containing Oxetanyl Group—

The photosensitive composition of the present disclosure may include a compound containing an oxetanyl group. The compound containing an oxetanyl group may contain only one oxetanyl group, but preferably contains two or more oxetanyl groups, in its molecule.

Specific examples of the compound containing an oxetanyl group which can be used include ARONE OXETANE OXT-121, OXT-221, OX-SQ, and PNOX (all manufactured by Toagosei Co., Ltd.).

The compound containing an oxetanyl group is preferably used singly, or as a mixture with the compound containing an epoxy group.

In a case in which the photosensitive composition of the present disclosure includes the compound containing an oxetanyl group, it is preferable that the compound is contained within a range of from 0.1 to 20% by mass, more preferably within a range of from 0.5 to 10% by mass, and yet more preferably within the range of from 1 to 5% by mass, with respect to the total solid content of the composition.

The photosensitive composition of the present disclosure may include only one kind of the compound containing an oxetanyl group, or two or more kinds thereof. When the photosensitive composition contains two or more kinds of the compound containing an oxetanyl group, it is preferable that the total content thereof falls within the above range.

—Block Isocyanate Compound—

The photosensitive composition of the present disclosure may include a block isocyanate compound.

The block isocyanate compound is not particularly limited as long as the compound contains a block isocyanate group. However, the compound is preferably a compound containing two or more block isocyanate groups within one molecule, from the viewpoint of curability. The upper limit of the number of block isocyanate groups is not particularly limited; however, 6 or less is preferred.

Further, the skeleton of the block isocyanate compound is not particularly limited, and any compound can be used as long as the compound contains two isocyanate groups within one molecule. The block isocyanate compound may be an aliphatic, alicyclic or aromatic polyisocyanate. Examples of the compound which can be suitably used include isocyanate compounds such as: 2,4-tolylene diisocyanate, 2,6-tolylene diisocyanate, isophorone diisocyanate, 1,6-hexamethylene diisocyanate, 1,3-trimethylene diisocyanate, 1,4-tetramethylene diisocyanate, 2,2,4-trimethylhexamethylene diisocyanate, 2,4,4-trimethylhexamethylene diisocyanate, 1,9-nonamethylene diisocyanate, 1,10-decamethylene diisocyanate, 1,4-cyclohexane diisocyanate, 2,2'-diethyl ether diisocyanate, diphenylmethane-4,4'-diisocyanate, o-xylene diisocyanate, m-xylene diisocyanate, p-xylene diisocyanate, methylene bis(cyclohexylisocyanate), cyclohexane-1,3-dimethylene diisocyanate, cyclohexane-1,4-dimethylene diisocyanate, 1,5-naphthalene diisocyanate, p-phenylene diisocyanate, 3,3'-methyleneditolylene-4,4'-diisocyanate, 4,4'-diphenyl ether diisocyanate, tetrachlorophenylene diisocyanate, norbornane diisocyanate, hydrogenated 1,3-xylylene diisocyanate, and hydrogenated 1,4-xylylene diisocyanate; and compounds having a prepolymer-type skeleton derived from these compounds. Of these, tolylene diisocyanate (TDI) diphenylmethane diisocyanate (MDI), hexamethylene diisocyanate (HDI), and isophorone diisocyanate (IPDI) are particularly preferred.

Examples of a mother structure of the block isocyanate compound in the composition of the present disclosure include a biuret type, an isocyanurate type, an adduct type, and a bifunctional prepolymer type.

Examples of block forming agents for forming a block structure of the block isocyanate compound include oxime compounds, lactam compounds, phenol compounds, alcohol compounds, amine compounds, active methylene compounds, pyrazole compounds, mercaptan compounds, imidazole compounds, and imide compounds. Of these, a block forming agent selected from an oxime compound, a lactam compound, a phenol compound, an alcohol compound, an amine compound, an active methylene compound, or a pyrazole compound is particularly preferred.

The block isocyanate compound which can be used in the composition of the present disclosure is available as a commercially product. Preferred examples thereof include: CORONATE AP stable M, CORONATE 2503, 2515, 2507, 2513, and 2555, and MILLIONATE MS-50 (all manufactured by TOSOH CORPORATION); TAKENATE B-830, B-815N, B-820NSU, B-842N, B-846N, B-870N, B-874N, and B-882N (all manufactured by Mitsui Chemicals, Inc.), and DURANATE 17B-60P, 17B-60PX, 17B-60P, TPA-B80X, TPA-B80E, MF-B60X, MF-B60B, MF-K60X, MF-K60B, E402-B80B, SBN-70D, SBB-70P, and K6000 (all manufactured by Asahi Kasei Corporation); and DESMODUR BL 1100, BL 1265 MPA/X, BL 3575/1, BL 3272MPA, BL 3370MPA, BL 3475BA/SN, BL 5375MPA, VPL S2078/2, BL 4265SN, PL 340, and PL350, and SUMIDUR BL3175 (all manufactured by Covestro AG).

In a case in which the photosensitive composition of the present disclosure includes the block isocyanate compound, it is preferable that the compound is contained within a range of from 0.1 to 20% by mass, more preferably within a range of from 0.5 to 10% by mass, and yet more preferably within a range of from 1 to 5% by mass, with respect to the total solid content of the composition.

The photosensitive composition of the present disclosure may include only one kind of the block isocyanate compound, or two or more kinds thereof. When the photosensitive composition contains two or more kinds of the block isocyanate compounds, it is preferable that the total content thereof falls within the above range.

The photosensitive composition of the present disclosure may include another compound(s) (such as an alkoxymethyl group-containing compound) other than the components described above, within the scope of the gist of the present disclosure. Examples of the alkoxymethyl group-containing compound include the compounds described in paragraphs 0192 to 0194 in JP-A No. 2011-221494.

<Antioxidant>

The photosensitive composition of the present disclosure may include an antioxidant, in addition to the components described above.

As the antioxidant, a known antioxidant may be contained. Incorporation of an antioxidant provides an advantage that it is possible to prevent a coloration of the resulting cured film, to reduce a decrease in the film thickness due to decomposition, and/or to improve a heat-resistant transparency of the cured film.

Examples of such an antioxidant include phosphorus antioxidants, amides, hydrazides, hindered phenol antioxidants, ascorbic acids, zinc sulfate, saccharides, nitrites, sulfites, thiosulfates, and hydroxyl amine derivatives. Of these, a hindered phenol antioxidant and a phosphorus antioxidant are particularly preferred, and a hindered phenol antioxidant is most preferred, from the viewpoint of preventing the coloration and a decrease in the film thickness of the resulting cured film. These may be used singly, or as a mixture of two or more kinds thereof.

Preferred examples of the commercially available product thereof include ADEKASTAB AO-60, ADEKASTAB AO-80 (both manufactured by ADEKA Corporation), and IRGANOX 1098 (manufactured by BASF JAPAN LTD.).

The content of the antioxidant is not particularly limited. However, the content is preferably from 0.1 to 10% by mass, more preferably from 0.2 to 5% by mass, and yet more preferably from 0.5 to 4% by mass, with respect to the total solid content of the photosensitive composition.

The photosensitive composition of the present disclosure may further include other components, such as a plasticizer, a thermal acid generator, and an acid increasing agent, if necessary, in addition to the components described above. As the above described components, those described, for example in JP-A No. 2009-98616 and JP-A No. 2009-244801, and other known components can be used. Further, any of various types of UV absorbers described in "New Development of Polymer Additives (NIKKAN KOGYO SHIMBUN, LTD.)" and metal inactivating agents may be incorporated into the photosensitive composition of the present disclosure.

<Method of Preparing Photosensitive Composition>

The method of preparing the photosensitive composition of the present disclosure is not particularly limited, and the composition can be prepared by a known method. For example, the photosensitive composition can be prepared by mixing and stirring each of the components at a predetermined ratio and using an arbitrary method, and then dissolving and/or dispersing the resultant. It is also possible to prepare the photosensitive composition, for example, by dissolving or dispersing each of the components in a solvent in advance to prepare solutions or dispersions of the components, and then mixing these solutions or dispersions at a predetermined ratio. The thus prepared photosensitive composition can be filtered, for example, using a filter having a pore size of 0.2 μm or the like, before being used.

(Cured Product and Method of Manufacturing Cured Product)

The cured product of the present disclosure is a cured product obtained by curing the photosensitive composition of the present disclosure. The cured product is preferably a cured film. Further, the cured product of the present disclosure is preferably a cured film obtained by the method of manufacturing a cured product according to the present disclosure.

The method of manufacturing a cured product according to the present disclosure is not particularly limited, as long as the method is a method in which the photosensitive composition of the present disclosure is cured to produce a cured product. However, the method preferably includes the following steps a to d in the following order:

step a: coating the photosensitive composition of the present disclosure on a substrate (a coating step);

step b: removing the solvent from the coated photosensitive composition (a solvent removal step);

step c: exposing at least a part of the coated photosensitive composition from which the solvent has been removed to actinic radiation (an exposure step); and step d: subjecting the exposed photosensitive composition to a heat treatment. step a: a coating step of coating the photosensitive composition of the present disclosure on a substrate (a heat treatment step).

Further, it is more preferable that the method of manufacturing a cured product according to the present disclosure includes the following step e, between the step c and the step d:

step e: developing the exposed photosensitive composition with an aqueous developer (a development step).

In addition, it is yet more preferable that the method of manufacturing a cured product according to the present disclosure further includes the following step f, between the step e and the step d:

step f: further irradiating light to the developed photosensitive composition (a post-exposure step).

In the coating step, it is preferable that the photosensitive composition of the present disclosure is coated on a substrate to form a wet film containing a solvent. Before coating the photosensitive composition on a substrate, the substrate can be cleaned, for example, by an alkaline cleaning or plasma cleaning. After cleaning the substrate, a surface of the substrate can be further treated with hexamethyldisilazane or the like. By carrying out the treatment, the adhesion of the photosensitive composition to the substrate tends to improve.

Examples of the substrate include inorganic substrates, resin substrates, and resin composite substrates.

Examples of the inorganic substrate include a substrate made of glass, quartz, silicon, or silicon nitride; and a composite substrate obtained by vapor deposition of a metal such as molybdenum, titanium, aluminum, or copper on such a substrate.

Examples of the resin substrate include a substrate made of a fluororesin such as polybutylene terephthalate, polyethylene terephthalate, polyethylene naphthalate, polybutylene naphthalate, polystyrene, polycarbonate, polysulfone, polyethersulfone, polyarylate, allyl diglycol carbonate, polyamide, polyimide, polyamideimide, polyetherimide, polybenzazole, polyphenylene sulfide, polycycloolefin, a norbornene resin, or polychlorotrifluoroethylene; and a substrate made of a synthetic resin such as a liquid crystal polymer, an acrylic resin, an epoxy resin, a silicone resin, an ionomer resin, a cyanate resin, a crosslinked fumaric acid diester resin, a cyclic polyolefin, an aromatic ether resin, a maleimide-olefin copolymer, cellulose, or an episulfide resin.

These substrates are rarely used in the forms as they are as described above. In general, the substrates are provided with a multilayer laminated structure, such as a TFT element, depending on the form of the final products.

Further, in the case of a touch panel having an on-cell structure, the photosensitive composition of the present disclosure can be applied on a LCD (liquid crystal display) cell or an OLED (organic light emitting diode) cell, which has been completed as a panel.

Since the photosensitive composition of the present disclosure has an excellent adhesion and corrosion prevention performance on a metal wiring, a substrate including a metal wiring is preferred as the substrate. The metal used for the metal wiring is preferably titanium, copper, aluminum, indium, tin, manganese, nickel, cobalt, molybdenum, tungsten, chromium, silver, neodymium, an oxide or an alloy thereof, or a laminated body thereof. The metal is more preferably molybdenum, titanium, aluminum, copper, an alloy thereof, or a laminated body thereof, and particularly preferably copper, a copper alloy, or a laminated body of molybdenum/aluminum/molybdenum. The metal or the metal oxide can be used singly, or in combination of a plurality thereof.

The method of coating the composition on a substrate is not particularly limited, and a method such as an ink jet method, a slit coating method, a spray coating method, a roll coating method, a spin coating method, a flow coating method, a slit and spin method, or a printing method can be used.

In the solvent removal step, it is preferable to remove the solvent from the film formed by coating the composition, by decompression (vacuuming) and/or heating, to form a dry film on the substrate. The heating in the solvent removal step is preferably carried out under conditions of a temperature of from 70 to 130° C. for a period of from 30 to 300 seconds. Further, in the solvent removal step, the solvent contained in the photosensitive composition need not be removed completely, as long as at least a part of the solvent is removed.

Further, the coating step and the solvent removal step may be carried out in this order or simultaneously, or may be repeated alternately. For example, the solvent removal step may be carried out after completing an ink-jet coating in the coating step; alternatively, a substrate may be heated in advance, and the solvent removal may be carried out while discharging the photosensitive composition by the ink-jet coating in the coating step.

The exposure step is a step in which a polymerization initiating species is generated from a photopolymerization initiator using actinic radiation to carry out the polymerization of the compound containing ethylenically unsaturated bonds, thereby curing at least a part of the photosensitive composition from which the solvent has been removed.

In the exposure step, it is preferable that actinic radiation having a wavelength of from 300 nm to 450 nm is irradiated on the resulting coating film, in a predetermined pattern.

Examples of exposure light sources which can be used in the exposure step include a low pressure mercury lamp, a high pressure mercury lamp, an ultra-high pressure mercury lamp, a chemical lamp, a LED light source, and an excimer laser generator. Actinic radiation having a wavelength of from 300 nm to 450 nm, such as i-ray (365 nm), h-ray (405 nm), or g-ray (436 nm) can be preferably used. It is also possible to adjust an irradiation light, if necessary, by irradiating light through a spectral filter, such as a short pass filter, a long pass filter, or a band pass filter. The irradiation of light is preferably carried out at a light exposure of from 1 to 500 mJ/cm$^2$.

As an exposure apparatus, an exposure apparatus utilizing any of various types of exposure systems can be used. Examples thereof include a mirror projection aligner, a stepper, a scanner, a proximity exposure apparatus, a contact exposure apparatus, a microlens array exposure apparatus, a lens scanner, and a laser exposure apparatus.

The exposure in the exposure step is preferably carried out in a state where oxygen is blocked, from the viewpoint of accelerating the curing. In order to block oxygen, the exposure is carried out, for example, under a nitrogen atmosphere, or using an oxygen-impermeable film.

The exposure in the exposure step may be, for example, a full surface exposure or a pattern exposure, as long as at least a part of the photosensitive composition from which the solvent has been removed is exposed.

Further, after carrying out the exposure step, a post-exposure heat treatment: Post Exposure Bake (hereinafter, also referred to as "PEB") can be carried out. When carrying out a PEB, the PEB is preferably carried out at a temperature of from 30° C. to 130° C., more preferably from 40° C. to 110° C., and particularly preferably from 50° C. to 100° C.

The method of heating is not particularly limited, and a known method can be used. Examples thereof include a method using a hot plate, an oven, or an infrared heater.

The heating is preferably carried out for a heating time of from about from 1 min to 30 min in the case of using a hot plate, and about from 20 min to 120 min in the case of using an apparatus other than a hot plate. When the temperature is within the above range, the heating can be carried out while reducing damage to the substrate and the apparatus.

In the development step, uncured portions of the photosensitive composition are developed and removed using an aqueous developer, to form a negative image. The developer to be used in the development step is preferably an alkaline aqueous developer.

The developer to be used in the development step preferably includes a basic compound. Examples of the basic compound include: alkali metal hydroxides such as lithium hydroxide, sodium hydroxide, and potassium hydroxide; alkali metal carbonates such as sodium carbonate, potassium carbonate, and cesium carbonate; alkali metal bicarbonates such as sodium bicarbonate, and potassium bicarbonate; tetraalkylammonium hydroxides such as tetramethylammonium hydroxide, tetraethylammonium hydroxide, tetrapropylammonium hydroxide, tetrabutylammonium hydroxide, and diethyldimethylammonium hydroxide; (hydroxyalkyl) trialkyl ammonium hydroxides such as choline; silicates such as sodium silicate, and sodium metasilicate; alkylamines such as ethylamine, propylamine, diethylamine, and triethylamine; alcohol amines such as dimethylethanolamine, and triethanolamine; and alicyclic amines such as 1,8-diazabicyclo[5.4.0]-7-undecene, and 1,5-diazabicyclo [4.3.0]-5-nonene.

Of these, at least one compound selected from the group consisting of sodium hydroxide, potassium hydroxide, tetramethylammonium hydroxide, tetraethylammonium hydroxide, tetrapropylammonium hydroxide, tetrabutylammonium hydroxide, and choline (2-hydroxyethyltrimethylammonium hydroxide) is preferred.

Further, it is also possible to use, as a developer, an aqueous solution obtained by adding an adequate amount of a water soluble organic solvent such as methanol or ethanol, or a surfactant, to an aqueous solution of an alkali as described above.

Preferred examples of the developer include an aqueous solution containing from 0.4 to 2.5% by mass of tetramethylammonium hydroxide.

The developer preferably has a pH of from 10.0 to 14.0.

The development is preferably carried out for a development time of from 30 to 500 seconds, and the development may be carried out by any of a liquid filling method (puddling method), a shower method, and a dipping method.

It is also possible to carry out a rinsing step after the development step. In the rinsing step, the substrate after the development is washed by pure water or the like to remove the developer and development residues adhered to the substrate. The rinsing can be carried out using a known rinsing method. Examples thereof include methods such as shower rinsing and dip rinsing.

The pattern exposure and the development can be carried out using a known method and a known developer. For example, the pattern exposure and development methods described in JP-A No. 2011-186398 and JP-A No. 2013-83937 can be suitably used.

The method of manufacturing a cured film according to the present disclosure preferably includes a step of subjecting the developed photosensitive composition to a heat treatment (post-bake), after the development step. By carrying out the heat treatment after the development of the photosensitive composition of the present disclosure, a cured film more excellent in strength can be obtained.

The heat treatment in the heat treatment step is preferably carried out at a heat treatment temperature of 180° C. or less, more preferably 150° C. or less, and yet more preferably 130° C. or less. The lower limit of the heat treatment temperature is preferably 80° C. or more, and more preferably 90° C. or more. The method of heating is not particularly limited, and a known method can be used. Examples thereof include a method using a hot plate, an oven, or an infrared heater. The heating time is preferably about from 1 min to 30 min in the case of using a hot plate, and about from 20 min to 120 min in the case of using an apparatus other than a hot plate. When the temperature is within the above range, the curing can be carried out while reducing damage to the substrate and the apparatus.

Further, before the heat treatment step (post-bake), it is also possible to carry out a heat treatment step after performing baking at a relatively low temperature (addition of a middle-bake step). In the case of carrying out the middle-bake, it is preferable to carry out heating at a temperature of from 90 to 150° C. for a period of from 1 to 60 minutes, followed by heat treatment at 100° C. or more. The middle-bake and post-bake can be carried out in multiple stages of 3 stages or more. By adjusting the manner of carrying out the middle-bake and the post-bake, as described above, the shape of the pattern can be adjusted. These heating steps can be carried out by a known heating method using a hot plate, an oven, or an infrared heater.

In addition, from the viewpoint of improving a film hardness, the method of manufacturing a cured film preferably includes a post-exposure step of further irradiating light to the developed photosensitive composition, after the development step and before the heat treatment step.

In the post-exposure step, it is preferable that an entire surface of the developed photosensitive composition is exposed to light. By carrying out the post-bake after the post-exposure step, it is possible to generate an initiating species from the photopolymerization initiator remaining on the exposed portions of the photosensitive composition, and to allow the initiating species to function as a catalyst which accelerates a crosslinking process, thereby accelerating a curing reaction of the film. Further, in the post-exposure step, the exposure is preferably carried out by a mercury lamp or a LED lamp at an energy density of about from 50 to 3,000 mJ/cm$^2$.

The cured film of the present disclosure is a cured film obtained by curing the photosensitive composition of the present disclosure.

The cured film of the present disclosure can be suitably used as an interlayer insulating film (insulating film) or an overcoat film (protective film). The cured film is used more suitably as an overcoat film for a touch panel, and yet more suitably as an overcoat film for a touch panel having an on-cell structure. The touch panel having an on-cell structure has the same meaning as an on-cell type touch panel display device to be described later. Further, the cured film of the present disclosure is preferably a cured film obtained by the method of manufacturing a cured film according to the present disclosure.

The photosensitive composition of the present disclosure serves to provide a cured film having a sufficient hardness, for example, a cured film having a hardness of H or more, even in a case in which the film is cured at a low temperature. The protective film formed by curing the photosensitive composition of the present disclosure has excellent cured film properties, and accordingly, the protective film is useful in applications such as organic EL display devices and liquid crystal display devices.

In particular, the cured film of the present disclosure can be suitably used as a wiring protective film for a touch panel, and more suitably as a wiring protective film for a touch panel having an on-cell structure.

Since the photosensitive composition of the present disclosure has an excellent curability and cured film properties, the composition is used for a structural member of a MEMS (Micro Electro Mechanical Systems) device, by incorporating a cured product or a resist pattern obtained by curing the photosensitive composition of the present disclosure as a partition wall, or as a part of mechanical driving components. Examples of the components of the MEMS device include a SAW (Surface Acoustic Wave) filter, a BAW (Bulk Acoustic Wave) filter, a gyro sensor, a micro shutter for use in a display, an image sensor, an electronic paper, an ink-jet head, a biochip, and a sealant. More specific examples thereof are disclosed in JP-A No. 2007-522531, JP-A No. 2008-250200 A, JP-A No. 2009-263544 A, and the like.

Figure 4:
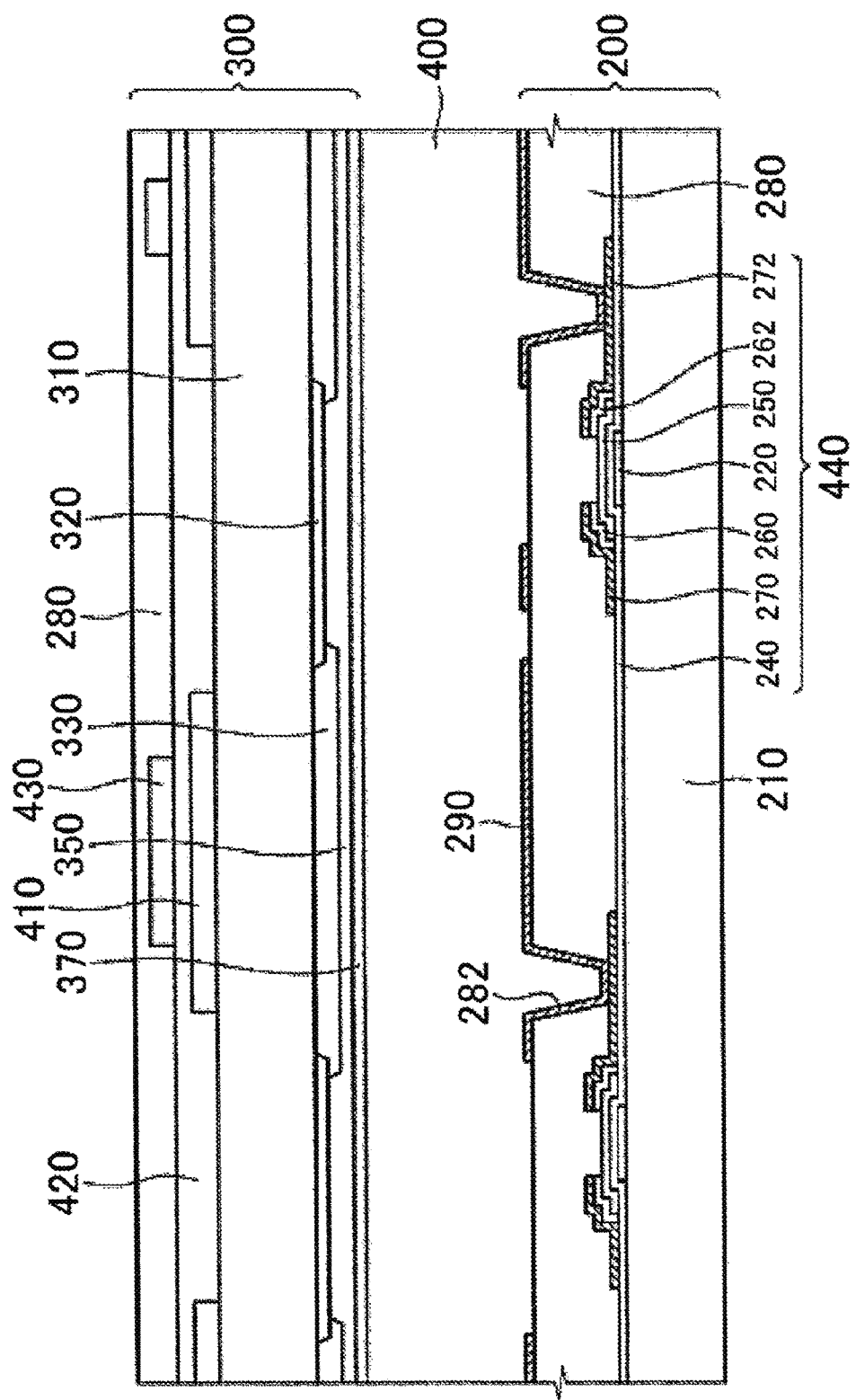
FIG. 4 is a schematic configuration diagram of another example of a liquid crystal display device having a function of a touch panel.

Since the photosensitive composition of the present disclosure has excellent planarization performance and transparency, the composition can also be used in the formation of, for example: a bank layer (16) and a planarization film (57) shown in FIG. 2 in JP-A No. 2011-107476; a partition wall (12) and a planarization film (102) shown in FIG. 4 (a) in JP-A No. 2010-9793; a bank layer (221) and a third interlayer insulating film (216b) shown in FIG. 10 in JP-A No. 2010-27591; a second interlayer insulating film (125) and a third interlayer insulating film (126) shown in FIG. 4 (a) in JP-A No. 2009-128577; and a planarization film (12) and a pixel separation insulating film (14) shown in FIG. 3 in JP-A No. 2010-182638. In addition, the composition can be suitably used also for a spacer for maintaining the thickness of a liquid crystal layer in a liquid crystal display device constant, a color filter of a liquid crystal display device or a color filter protective film, imaging optics of an on-chip color filter for a facsimile machine, an electronic copying machine, or a solid-state image sensor or the like, or a microlens of an optical fiber connector.

(Display Device and Touch Panel)

The display device of the present disclosure includes the cured film of the present disclosure.

Examples of the display device of the present disclosure include various types of display devices such as organic EL display devices, liquid crystal display devices, and touch panel display devices.

The organic EL display device of the present disclosure includes the cured film of the present disclosure.

The organic EL display device is not particularly limited, as long as the device includes a planarization film or an interlayer insulating film which is formed using the photosensitive composition of the present disclosure. Examples thereof include various types of known organic EL display devices having a variety of structures.

Specific examples of the TFT (Thin-Film Transistor) included in the organic EL display device of the present disclosure include an amorphous silicon-TFT, a low-temperature polysilicon-TFT, and an oxide semiconductor TFT. Since the cured film of the present disclosure has excellent electrical properties, the film can be suitably used in combination with the TFTs as described above.

FIG. 1 is a schematic configuration diagram of an example of an organic EL display device. Specifically, FIG. 1 shows a schematic sectional view of a substrate in a bottom-emission type organic EL display device. In this embodiment, the substrate includes a planarization film 4.

On a glass substrate 6, bottom-gate type TFTs 1 are formed. An insulating film 3 made of $Si_3N_4$ is formed on the TFTs 1 so as to cover the same. After forming contact holes, which are not shown here, in the insulating film 3, a wiring 2 (height: 1.0 μm) connected to the TFTs 1 through the contact holes is formed on the insulating film 3. The wiring 2, which is, for example, a metal wiring, connects between the respective TFTs 1, or between each TFT 1 and an organic EL element to be formed in a subsequent step.

Further, in order to planarize irregularities due to the formation of the wiring 2, the planarization film 4 is formed on the insulating film 3 so as to fill the irregularities caused by the wiring 2.

On the planarization film 4, a bottom-emission type organic EL element is formed. Specifically, first electrodes 5 made of ITO are formed on the planarization film 4, and are connected to the wiring 2 through contact holes 7. The first electrodes 5 correspond to an anode of the organic EL element.

Insulating films 8 are formed in a shape covering the periphery of the respective first electrodes 5. By providing the insulating films 8, a short circuit between the first electrodes 5 and a second electrode to be formed in a subsequent step can be prevented.

Further, although not shown in FIG. 1, a hole transport layer, an organic light emitting layer, and an electron transport layer may be formed sequentially by vapor deposition through a desired pattern mask, a second electrode made of Al is formed on the entire surface of the upper side of the substrate, and then a sealing glass plate is pasted on the resulting substrate with a UV curable epoxy resin to seal the substrate, to provide an active matrix type organic EL display device in which each organic EL element is connected with a TFT 1 for driving the organic EL element.

The liquid crystal display device of the present disclosure includes the cured film of the present disclosure.

The liquid crystal display device of the present disclosure is not particularly limited, as long as the device includes an overcoat film (protective film), a planarization film, and/or an interlayer insulating film, formed using the photosensitive composition of the present disclosure, and examples thereof include known liquid crystal display devices of various structures.

Specific examples of the TFT (Thin-Film Transistor) included in the liquid crystal display device of the present disclosure include an amorphous silicon-TFT, a low-temperature polysilicon-TFT, and an oxide semiconductor TFT (for example, indium gallium zinc oxide, namely, IGZO). Since the cured film of the present disclosure has excellent electrical properties, the film can be suitably used in combination with the TFTs as described above.

Examples of liquid crystal driving modes which can be employed in the liquid crystal display device of the present disclosure include a TN (Twisted Nematic) mode, a VA (Vertical Alignment) mode, an IPS (In-Plane-Switching) mode, a FFS (Fringe Field Switching) mode, and an OCB (Optically Compensated Bend) mode.

Regarding the configuration of a panel, the cured film of the present disclosure can be used in a COA (Color Filter on Array) type liquid crystal display device. For example, the cured film can be used as an organic insulating film (115) disclosed in JP-A No. 2005-284291, or as an organic insulating film (212) disclosed in JP-A No. 2005-346054. Further, specific examples of an alignment mode of a liquid crystal alignment film, which can be employed in the liquid crystal display device of the present disclosure, include rubbing alignment and photo-alignment. A PSA (Polymer Sustained Alignment) technology described in JP-A No. 2003-149647 or JP-A No. 2011-257734 may also be utilized.

In addition, the photosensitive composition of the present disclosure and the cured film of the present disclosure are not limited to the applications described above, and can be used in various types of applications. For example, the photosensitive composition and the cured film can be suitably used for a protective film, a spacer for maintaining the thickness of a liquid crystal layer in a liquid crystal display device constant, or a microlens provided on a color filter in a solid-state image sensor, in addition to the planarization films and the interlayer insulating films.

FIG. 2 is a schematic sectional diagram showing an example of an active matrix type liquid crystal display device 10. The color liquid crystal display device 10 is a liquid crystal panel including a backlight unit 12 on a back face thereof. The liquid crystal panel includes elements of TFTs 16 which correspond to all pixels disposed between two glass substrates 14 and 15 each having a polarizing film attached thereon. ITO transparent electrodes 19, which are formed through contact holes 18 provided in a cured film 17 and which form pixel electrodes, are each connected to the respective elements provided on one of the glass substrates. On the ITO transparent electrodes 19, a liquid crystal layer 20 and a RGB color filter 22 with a black matrix are provided.

The light source of the backlight is not particularly limited, and a known light source can be used. Examples of the light source include a white LED, a multi-color LED capable of emitting a blue, red or green light, a fluorescent lamp (cold-cathode tube), and an organic EL.

The liquid crystal display device can be formed as a 3D (stereoscopic vision) type, or a touch panel type (touch panel display device). Further, the liquid crystal display device can also be formed as a flexible type, and the cured film can be used as a second interlayer insulating film (48) disclosed in JP-A No. 2011-145686, or an interlayer insulating film (520) disclosed in JP-A No. 2009-258758.

The touch panel of the present disclosure is a touch panel in which all or a part of the insulating layers and/or protective layers is made of the cured product(s) of the photosensitive composition of the present disclosure. It is preferable that the touch panel of the present disclosure includes at least a transparent substrate, an electrode and an insulating layer and/or a protective layer.

The touch panel of the present disclosure display device is preferably a touch panel display device including the touch panel of the present disclosure. The touch panel of the present disclosure may be of any known type such as a resistive film type, a capacitive type, an ultrasonic type or an electromagnetic induction type. Of these, a capacitive type touch panel is preferred.

Examples of the capacitive type touch panel include touch panels disclosed in JP-A No. 2010-28115, and WO 2012/057165.

Examples of the touch panel display device include so-called in-cell type display devices (such as those shown in FIG. 5, FIG. 6, FIG. 7, and FIG. 8 in JP-A No. 2012-517051), so-called on-cell type display devices (such as those shown in FIG. 14 in JP-A No. 2012-43394, and FIG. 2 (b) in WO 2012/141148), OGS (One Glass Solution) type display devices, TOL (Touch-on-Lens) type display devices, and display devices having other configurations (such as those shown in FIG. 6 in JP-A No. 2013-164871).

Further, FIG. 3 is a schematic configuration diagram showing an example of a touch panel display device.

The cured film of the present disclosure can be suitably used, for example, as protective films disposed between respective layers shown in FIG. 3, and also as an interlayer insulating film which serves to isolate the respective sensing electrodes of the touch panel from each other. The sensing electrodes of the touch panel are preferably made of silver, copper, aluminum, titanium, or molybdenum, or an alloy thereof.

In FIG. 3, reference numeral 110 denotes a pixel substrate, and reference numeral 140 denotes a liquid crystal layer, reference numeral 120 denotes an opposing substrate, and reference numeral 130 denotes a sensor unit. The pixel substrate 110 include, in the order shown in FIG. 3 starting from the lower side, a polarizing plate 111, a transparent substrate 112, a common electrode 113, an insulating layer 114, pixel electrodes 115, an alignment film 116. The opposing substrate 120 includes in the order shown in FIG. 3 starting from the lower side, an alignment film 121, color filters 122, and a transparent substrate 123. The sensor unit 130 includes a phase difference film 124, an adhesive layer 126, and a polarizing plate 127. Further, in FIG. 3, reference numerals 125 denote sensing electrodes for the sensor. The cured film of the present disclosure can be used as the insulating layer (114) (also referred to as an interlayer insulating film) or various types of protective films (not shown) included in the pixel substrate portion, various types of protective films (not shown) included in the pixel substrate portion, various types of protective films (not shown) included in the opposing substrate portion, and various types of protective films (not shown) included in the sensor unit portion.

By applying the present disclosure, it is possible to display a pattern having excellent design properties, even in a static driven liquid crystal display device. For example, the cured film of the present disclosure can be used as an insulating film in a polymer network liquid crystal display device disclosed in JP-A No. 2001-125086.

FIG. 4 is a schematic configuration diagram showing another example of a touch panel display device.

The touch panel display device includes: a lower display board 200 which corresponds to a thin film transistor display board including thin film transistors (TFTs) 440; an upper display board 300 corresponding to a color filter display board, which is disposed facing the lower display board 200 and which includes a plurality of color filters 330 on the face thereof facing the lower display board 200; and a liquid crystal layer 400 provided between the lower display board 200 and the upper display board 300. The liquid crystal layer 400 includes liquid crystal molecules (not shown).

The lower display board 200 includes: a first insulating substrate 210, thin film transistors (TFTs) disposed on the first insulating substrate 210; an insulating film 280 formed on the upper surface of the thin film transistors (TFTs), and pixel electrodes 290 disposed on the insulating film 280. Each of the thin film transistors (TFTs) can include a gate electrode 220; a gate insulating film 240 covering the gate electrode 220; a semiconductor layer 250; ohmic contact layers 260 and 262, a source electrode 270, and a drain electrode 272. The insulating film 280 is provided with contact holes 282 so as to allow the drain electrode 272 of each of the thin film transistors (TFTs) to be exposed.

The upper display board 300 includes: light shielding members 320 disposed on one face of a second insulating substrate 310, and arranged in the form of matrix; an alignment film 350 disposed on the second insulating substrate 310; the color filters 330 disposed on the alignment film; and a common electrode 370 which is disposed on the color filters 330, and which applies voltage to the liquid crystal layer 400 corresponding to the pixel electrodes 290 included in the lower display board 200.

In the touch panel display device shown in FIG. 4, sensing electrodes 410, an insulating film 420, a driving electrode 430, and an insulating film (protective film) 280 are disposed on the other face of the second insulating substrate 310. As described above, in the production of the liquid crystal display device shown in FIG. 4, the formation of the sensing electrodes 410, the insulating film 420, and the driving electrode 430, which are the components of a touch screen, can be carried out along with the formation of the upper display board 300. In particular, the cured film obtained by curing the photosensitive composition of the present disclosure can be suitably used as the insulating film 280 and/or the insulating film 420.

EXAMPLES

The embodiment of the present invention will now be described in further detail, with reference to Examples. Materials, amounts to be used, ratios, details and procedures of treatments, and the like, described in the following Examples can be altered, if appropriate, as long as the gist of the present disclosure is not deviated. Therefore, the scope of the present disclosure is not limited by the specific examples described below. Note that, "part(s)" and "%" are on mass basis, unless otherwise specified.

<Compound Having Two or More Ethylenically Unsaturated Bonds (Multifunctional Monomer)>

N-1: ARONIX M-405 (manufactured by Toagosei Co., Ltd.), dipentaerythritol pentaacrylate and dipentaerythritol hexaacrylate (DPHA, dipentaerythritol hexaacrylate:dipentaerythritol pentaacrylate=85:15 (molar ratio)), acid value<0.2 mg KOH/g, mass of the compound per 1 mol of ethylenically unsaturated bonds (ethylenically unsaturated bond equivalent, C=C equivalent): 99 g/mol N-2: A-BPE-20 (manufactured by Shin Nakamura Chemical Co., Ltd.), the following compound, C=C equivalent: 608 g/mol N-3: ATM-35E (manufactured by Shin Nakamura Chemical Co., Ltd.), ethoxylated pentaerythritol tetraacrylate (ethylene oxide 35 mol adduct), C=C equivalent: 473 g/mol N-4: A-TMMT (manufactured by Shin Nakamura Chemical Co., Ltd.), pentaerythritol tetraacrylate, C=C equivalent: 88 g/mol N-5: BzMA (manufactured by Tokyo Chemical Industry Co., Ltd.), benzyl methacrylate, C=C equivalent: 176 g/mol N-6: U-15HA (manufactured by Shin Nakamura Chemical Co., Ltd.), urethane acrylate, C=C equivalent: 153 g/mol N-7: A mixture of the following two kinds of compounds (molar ratio 6:4), C=C equivalent: 113 g/mol

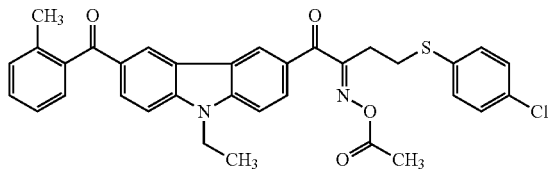

K-1

<Silica Particles>

P-1: PMA-ST (manufactured by Nissan Chemical Industries, Ltd.), a silica particles-containing PGMEA dispersion liquid, average primary particle size: from 10 to 15 nm P-2: SRD-K (manufactured by Sakai Chemical Industry Co., Ltd.), a titanium oxide particle-containing methyl ethyl ketone (MEK) dispersion liquid, average primary particle size: 5 nm P-3: SZR-K (manufactured by Sakai Chemical Industry Co., Ltd.), a zirconium oxide particle-containing MEK dispersion liquid, average primary particle size: 4 nm P-4: PGM-ST (manufactured by Nissan Chemical Industries, Ltd.), a silica particles-containing PGMEA dispersion liquid, average primary particle size: from 10 to 15 nm

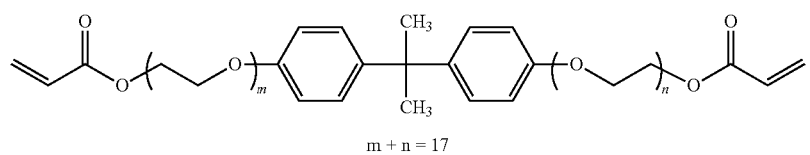

N-2 m + n = 17

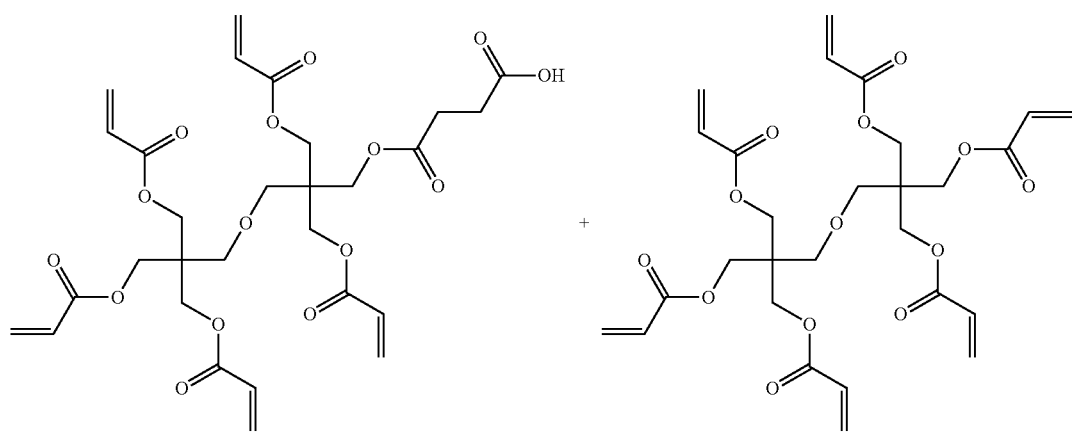

N-7

Mixture of 6:4

<Photopolymerization Initiator>

K-1: The following compound, a synthesized product, an oxime ester compound

K-2: IRGACURE OXE01 (manufactured by BASF JAPAN LTD.), an oxime ester compound

K-3: IRGACURE OXE2 (manufactured by BASF JAPAN LTD.), an oxime ester compound

<Heterocyclic Compound>

T-1 to T-8: The following compounds

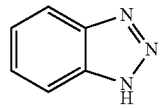

T-1

-continued

T-2
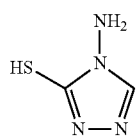

T-3
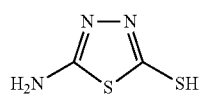

T-4
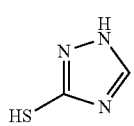

-continued

T-7
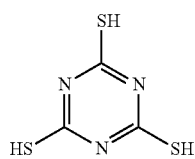

T-8
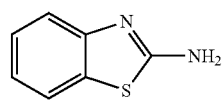

<Maleimide Compound>

M-1 to M-5: The following compounds

M-1
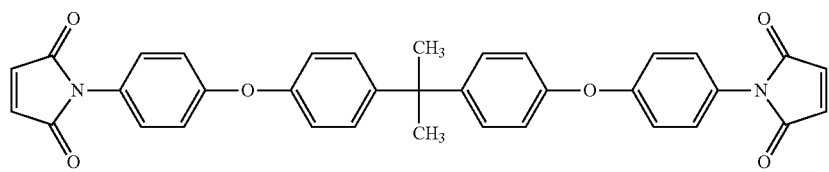

M-2
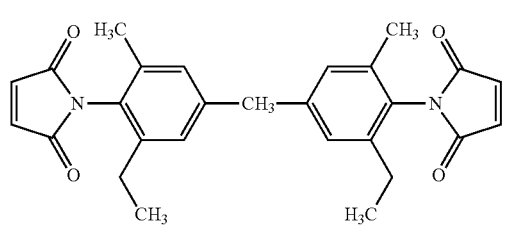

M-3
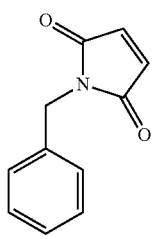

M-4
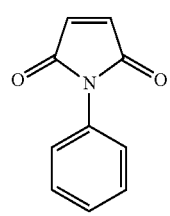

M-5
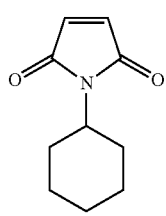

-continued

T-5
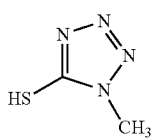

T-6
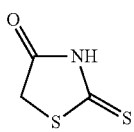

<Solvent>

PGMEA: Propylene glycol monomethyl ether acetate, manufactured by Daicel Corporation EEP: 3-ethoxyethyl propionate, manufactured by Union Carbide Corporation MEDG: Diethylene glycol methyl ethyl ether, HISOLVE EDMS, manufactured by TOHO Chemical Industry Co., Ltd.

PGME: Propylene glycol monomethyl ether, manufactured by Daicel Corporation

<Resin>

B-1: The following acrylic resin, Mw: 30,000, acid value: 95 mg KOH/g

B-2: The following acrylic resin, Mw: 30,000, acid value: 186 mg KOH/g

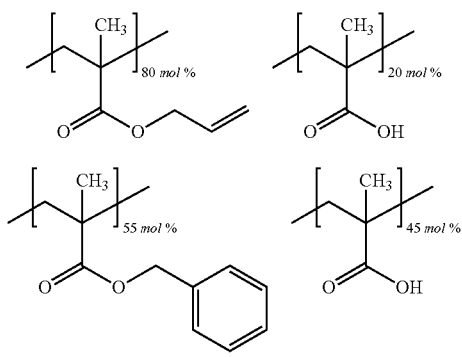

B-1
B-2

<Additive (Alkoxysilane Compound)>
S-1: KBM-5103 (manufactured by Shin-Etsu Chemical Co., Ltd.), 3-acryloxypropyltrimethoxysilane, C=C equivalent: 234 g/mol
S-2: KBE-846 (manufactured by Shin-Etsu Chemical Co., Ltd.), bis(triethoxysilylpropyl)tetrasulfide
<Surfactant>
F-1: MEGAFACE F-554 (manufactured by DIC Corporation, a 2% PGMEA solution of perfluoroalkyl group-containing nonionic surfactant)
<Polymerization Inhibitor>
J-1: Phenothiazine (manufactured by Seiko Chemical Co., Ltd.)

Example 1

<Preparation of Photosensitive Composition>
A photosensitive composition was prepared as follows.
Propylene glycol monomethyl ether acetate (PGMEA): 62.21 parts
Polymerization inhibitor J-1 (a 1% PGMEA solution of phenothiazine): 3.80 parts
N-1 (DPHA, ARONIX M-405): 9.25 parts
Photopolymerization initiator K-1: 0.57 parts
S-1 (KBM-5103): 1.71 parts
M-1 (2,2-bis[4-(4-maleimidephenoxy)phenyl]propane): 0.95 parts
T-4 (3-mercapto-1,2,4-triazole): 0.38 parts
Surfactant F-1 (MEGAFACE F-554, manufactured by DIC Corporation, a 2% PGMEA solution of perfluoroalkyl group-containing nonionic surfactant): 0.855 parts
P-1 (PMA-ST, a 30% silica particle-containing PGMEA dispersion liquid): 20.27 parts
The above described components were stirred with a magnetic stirrer for 1 hour.
The resultant was then filtered using a 0.45 μm membrane filter, to obtain a photosensitive composition (solid content: 19%) of Example 1.
—Evaluation—
The photosensitive composition of Example 1 was evaluated according to the following evaluation methods. The evaluation results are shown in Table 3.
<Adhesion>
The photosensitive composition was spin coated on a glass substrate (brand name: XG, manufactured by Corning Incorporated) having a size of 100 mm×100 mm, and the resultant was dried (pre-bake) on a hot plate controlled at 90° C. for 100 seconds, to form a film having a film thickness of 2.0 μm on the substrate. Then the entire surface of the substrate was exposed at 50 mJ/cm$^2$ (intensity of illumination: 20 mW/cm$^2$), and the substrate was heated (post-bake) in an oven at 150° C. for 60 minutes.

The resulting substrate was immersed in an 8% aqueous solution of KOH heated to 40° C. for 500 seconds, and then washed with pure water, followed by removing the washing liquid with an air knife. Subsequently, a cross cut evaluation of 100 squares was carried out in accordance with JIS K5600: 1999, and areas in which peeling had occurred was evaluated according to the following standards.
5: No peeling is observed.
4: The peeling rate is more than 0% but equal to or less than 20%.
3: The peeling rate is more than 20% but equal to or less than 50%.
2: The peeling rate is more than 50% but equal to or less than 70%.
1: The peeling rate is more than 70%, or the entire surface of the film has peeled off before performing the cross cut.
<Corrosion Prevention Performance>
On a substrate onto which the base material (base material I) shown in Table 3 had been vapor-deposited, the photosensitive composition was spin coated. The resultant was dried (pre-bake) on a hot plate controlled at 90° C. for 100 seconds, to form a film having a film thickness of 2.0 μm on the substrate. Then the entire surface of the substrate was exposed at 50 mJ/cm$^2$ (intensity of illumination: 20 mW/cm$^2$), and the substrate was heated (post-bake) in an oven at 150° C. for 60 minutes.
The base material I used is one formed by sputtering Ti to a thickness of 10 nm on a glass substrate having a size of 10 cm×10 cm, followed by sputtering Cu to a thickness of 200 nm. The base material II is one formed by sputtering Mo to a thickness of 50 nm on a glass substrate having a size of a 10 cm×10 cm, followed by sputtering Al to the thickness of 200 nm, and then Mo to a thickness of 50 nm, in this order.
On the resulting substrate, an artificial sweat having the following composition was dropped. The resultant was left to stand for 24 hours, and then placed in a thermo-hygrostat controlled at a temperature of 85° C. and a humidity of 85% RH. The length of time until the occurrence of corrosion was measured, and evaluated according to the following standards.
1: Less than 24 hours
2: 24 hours or more but less than 78 hours
3: 78 hours or more but less than 150 hours
4: 150 hours or more but less than 300 hours
5: 300 hours or more
—Composition of Artificial Sweat—
Pure water: 100.000 g
Sodium chloride: 1.000 g
Lactic acid: 0.100 g
Disodium hydrogen phosphate anhydrous: 0.025 g
L-histidine hydrochloride monohydrate: 0.025 g
<Hardness>
On a glass substrate (brand name: XG, manufactured by Corning Incorporated) having a size of 100 mm×100 mm, the photosensitive composition was coated by ink jet coating, and the resultant was dried (pre-bake) in an oven controlled at 90° C. for 100 seconds, to form a film having a film thickness of 1.0 μm on the substrate. Then the entire surface of the substrate was exposed at 300 mJ/cm$^2$ (intensity of illumination: 20 mW/cm$^2$), and the substrate was heated (post-bake) in an oven at 150° C. for 60 minutes.
A pencil hardness of the resulting substrate was measured in accordance with JIS K5600-5-4: 1999. As a pencil, UNI manufactured by Mitsubishi Pencil Co., Ltd. was used. The measurement was carried out at a load of 750 g, and at a pencil angle of 45°.

1: B or less
2: HB
3: H
4: 2H
5: 3H or more

<Transparency>

On a glass substrate (brand name: XG, manufactured by Corning Incorporated) having a size of 1,000 mm×1,000 mm, the photosensitive composition was coated by slit coating, and the resultant was dried (pre-bake) in an oven controlled at 90° C. for 100 seconds, to form a film having a film thickness of 1.0 µm on the substrate. Then the entire surface of the substrate was exposed at 300 mJ/cm² (intensity of illumination: 20 mW/cm²), and the substrate was heated (post-bake) in an oven at 150° C. for 60 minutes.

The transmittance of the resulting substrate was measured by MCPD-3000 (manufactured by Otsuka Electronics Co., Ltd.), using a glass substrate (brand name: XG, manufactured by Corning Incorporated) as a reference.

1: The transmittance at 400 nm is less than 95%
2: The transmittance at 400 nm is 95% or more but less than 97%
3: The transmittance at 400 nm is 97% or more Examples 2 to 27, and Comparative Examples 1 to 16

Photosensitive compositions of Examples 2 to 27 and Comparative Examples 1 to 16 were prepared, using the respective components shown in Table 1 or Table 2 in an amounts shown in Table 1 or Table 2, and using the same surfactant and polymerization inhibitor as in Example 1, in the same manner as in Example 1. Each of the photosensitive compositions of Examples 2 to 27 and Comparative Examples 1 to 16 was adjusted to a solid content of 19%, with PGMEA as a solvent. Each of the amounts of P-1 to P-3 shown in Table 1 or Table 2 represents the solid content of the particles themselves.

The resulting photosensitive compositions were evaluated in the same manner as in Example 1. The evaluation results are summarized in Table 3 or Table 4.

TABLE 1

|  | Multifunctional Monomer | | Photopolymerization Initiator | | Silica Particles | | Heterocyclic Compound | |
| --- | --- | --- | --- | --- | --- | --- | --- | --- |
|  | Type | Added Amount | Type | Added Amount | Type | Added Amount | Type | Added Amount |
| Examples 1 | N-1 | 48.71 | K-1 | 3 | P-1 | 32 | T-4 | 2 |
| Examples 2 | N-1 | 24.36 | K-1 | 3 | P-1 | 32 | T-4 | 2 |
| Examples 3 | N-1 | 36.53 | K-1 | 3 | P-1 | 32 | T-4 | 2 |
| Examples 4 | N-1 | 34.36 | K-1 | 3 | P-1 | 12 | T-4 | 2 |
| Examples 5 | N-1 | 51.53 | K-1 | 3 | P-1 | 12 | T-4 | 2 |
| Examples 6 | N-1 | 68.71 | K-1 | 3 | P-1 | 12 | T-4 | 2 |
| Examples 7 | N-1 | 26.36 | K-2 | 3 | P-1 | 28 | T-3 | 2 |
| Examples 8 | N-4 | 23.36 | K-2 | 3 | P-1 | 36 | T-3 | 2 |
| Examples 9 | N-1 | 27.36 | K-1 | 3 | P-1 | 30 | T-2 | 2 |
| Examples 10 | N-1 | 27.36 | K-1 | 3 | P-1 | 30 | T-2 | 2 |
| Examples 11 | N-4 | 27.36 | K-2 | 3 | P-1 | 30 | T-4 | 2 |
| Examples 12 | N-4 | 27.36 | K-2 | 3 | P-1 | 30 | T-4 | 2 |
| Examples 13 | N-4 | 27.36 | K-2 | 3 | P-1 | 30 | T-4 | 2 |
| Examples 14 | N-4 | 27.36 | K-2 | 3 | P-1 | 30 | T-4 | 2 |
| Examples 15 | N-1 | 63.71 | K-3 | 3 | P-1 | 20 | T-1 | 3 |
| Examples 16 | N-1 | 63.71 | K-3 | 3 | P-1 | 20 | T-2 | 3 |
| Examples 17 | N-1 | 63.71 | K-3 | 3 | P-1 | 20 | T-3 | 3 |
| Examples 18 | N-4/N-2 | 30.00/18.52 | K-3 | 3 | P-1 | 20 | T-2 | 2 |
| Examples 19 | N-1/N-3 | 38.30/16.42 | K-2 | 3 | P-1 | 30 | T-3 | 2 |
| Examples 20 | N-4 | 27.36 | K-1 | 3 | P-1 | 30 | T-4 | 2 |
| Examples 21 | N-1 | 27.36 | K-2 | 3 | P-1 | 30 | T-2 | 2 |
| Examples 22 | N-1 | 26.36 | K-2 | 3 | P-1 | 28 | T-5 | 2 |
| Examples 23 | N-1 | 26.36 | K-2 | 3 | P-1 | 28 | T-6 | 2 |
| Examples 24 | N-1 | 26.36 | K-2 | 3 | P-1 | 28 | T-7 | 2 |
| Examples 25 | N-1 | 26.36 | K-2 | 3 | P-1 | 28 | T-8 | 2 |
| Examples 26 | N-1 | 26.36 | K-2 | 3 | P-1 | 28 | T-4 | 2 |
| Examples 27 | N-1 | 26.36 | K-2 | 3 | P-1 | 28 | T-4 | 2 |

|  | Maleimide Compound | | Resin | | Additive | | Solvent | C = C Equivalent (g/mol) |
| --- | --- | --- | --- | --- | --- | --- | --- | --- |
|  | Type | Added Amount | Type | Added Amount | Type | Added Amount | Type |  |
| Examples 1 | M-1 | 5 | — | — | S-1 | 9 | PGMEA | 182 |
| Examples 2 | M-1 | 5 | B-1 | 24.36 | S-1 | 9 | PGMEA | 213 |
| Examples 3 | M-1 | 5 | B-2 | 12.18 | S-1 | 9 | PGMEA | 235 |
| Examples 4 | M-1 | 5 | B-1 | 34.36 | S-1 | 9 | PGMEA | 157 |
| Examples 5 | M-1 | 5 | B-2 | 17.18 | S-1 | 9 | PGMEA | 173 |
| Examples 6 | M-1 | 5 | — | — | S-1 | 9 | PGMEA | 133 |
| Examples 7 | M-1 | 5 | B-1 | 26.36 | S-1 | 9 | PGMEA | 199 |
| Examples 8 | M-1 | 5 | B-1 | 23.36 | — | — | PGMEA | 226 |
| Examples 9 | M-1 | 5 | B-1 | 27.36 | S-2 | 5 | PGMEA | 208 |
| Examples 10 | M-1 | 5 | B-1 | 27.36 | S-2 | 5 | PGMEA | 208 |
| Examples 11 | M-2 | 5 | B-1 | 27.36 | S-2 | 5 | PGMEA | 192 |
| Examples 12 | M-3 | 5 | B-1 | 27.36 | S-2 | 5 | PGMEA | 191 |

TABLE 1-continued

| | | | | | | | | |
|---|---|---|---|---|---|---|---|---|
| Examples 13 | M-4 | 5 | B-1 | 27.36 | S-2 | 5 | PGMEA | 190 |
| Examples 14 | M-5 | 5 | B-1 | 27.36 | S-2 | 5 | PGMEA | 190 |
| Examples 15 | M-2 | 5 | — | — | S-1 | 5 | PGMEA | 145 |
| Examples 16 | M-2 | 5 | — | — | S-1 | 5 | PGMEA | 145 |
| Examples 17 | M-2 | 5 | — | — | S-1 | 5 | PGMEA | 145 |
| Examples 18 | M-1 | 5 | B-1 | 16.19 | S-1 | 5 | PGMEA | 192 |
| Examples 19 | M-1 | 5 | — | — | S-1 | 5 | PGMEA | 235 |
| Examples 20 | M-2 | 5 | B-1 | 27.36 | S-1 | 5 | PGMEA | 184 |
| Examples 21 | M-1 | 5 | B-1 | 27.36 | S-2 | 5 | PGMEA | 208 |
| Examples 22 | M-1 | 5 | B-1 | 26.36 | S-1 | 9 | PGMEA | 199 |
| Examples 23 | M-1 | 5 | B-1 | 26.36 | S-1 | 9 | PGMEA | 199 |
| Examples 24 | M-1 | 5 | B-1 | 26.36 | S-1 | 9 | PGMEA | 199 |
| Examples 25 | M-1 | 5 | B-1 | 26.36 | S-1 | 9 | PGMEA | 199 |
| Examples 26 | M-1 | 5 | B-1 | 26.36 | S-1 | 9 | MEDG | 199 |
| Examples 27 | M-1 | 5 | B-1 | 26.36 | S-1 | 9 | PGMEA/EEP = 9/1 | 199 |

TABLE 2

| | Multifunctional Monomer | | Photopolymerization Initiator | | Inorganic Particles | | Heterocyclic Compound | |
|---|---|---|---|---|---|---|---|---|
| | Type | Added Amount | Type | Added Amount | Type | Added Amount | Type | Added Amount |
| Comparative Example 1 | N-1 | 80.71 | K-3 | 3 | — | — | T-2 | 2 |
| Comparative Example 2 | N-1 | 40.36 | K-3 | 3 | — | — | T-2 | 2 |
| Comparative Example 3 | N-1 | 57.71 | K-3 | 3 | P-1 | 30 | — | — |
| Comparative Example 4 | N-1 | 75.71 | K-3 | 3 | P-1 | 12 | — | — |
| Comparative Example 5 | N-1 | 52.71 | K-3 | 3 | P-1 | 30 | — | — |
| Comparative Example 6 | N-1 | 55.71 | K-3 | 3 | P-1 | 30 | T-4 | 2 |
| Comparative Example 7 | N-2 | 25.36 | K-3 | 3 | P-1 | 30 | T-2 | 2 |
| Comparative Example 8 | N-3 | 50.71 | K-3 | 3 | P-1 | 30 | T-4 | 2 |
| Comparative Example 9 | N-4 | 55.71 | K-3 | 3 | P-1 | 30 | T-4 | 2 |
| Comparative Example 10 | N-4 | 57.71 | K-3 | 3 | P-1 | 30 | — | — |
| Comparative Example 11 | N-1 | 52.71 | K-1 | 3 | P-1 | 30 | — | — |
| Comparative Example 12 | N-1 | 52.71 | K-2 | 3 | P-1 | 30 | T-2 | 5 |
| Comparative Example 13 | N-1 | 52.71 | K-2 | 3 | P-1 | 30 | T-3 | 5 |
| Comparative Example 14 | N-4 | 27.36 | K-2 | 3 | P-2 | 30 | T-4 | 2 |
| Comparative Example 15 | N-4 | 27.36 | K-2 | 3 | P-3 | 30 | T-4 | 2 |
| Comparative Example 16 | N-5 | 48.71 | K-1 | 3 | P-1 | 32 | T-4 | 2 |

| | Maleimide Compound | | Resin | | Additive | | | C = C |
|---|---|---|---|---|---|---|---|---|
| | Type | Added Amount | Type | Added Amount | Type | Added Amount | Solvent Type | Equivalent (g/mol) |
| Comparative Example 1 | M-1 | 5 | — | — | S-1 | 9 | PGMEA | 115 |
| Comparative Example 2 | M-1 | 5 | B-1 | 40.36 | S-1 | 9 | PGMEA | 135 |
| Comparative Example 3 | — | — | — | — | S-1 | 9 | PGMEA | 161 |
| Comparative Example 4 | — | — | — | — | S-1 | 9 | PGMEA | 125 |
| Comparative Example 5 | M-1 | 5 | — | — | S-1 | 9 | PGMEA | 170 |
| Comparative Example 6 | — | — | — | — | S-1 | 9 | PGMEA | 166 |

TABLE 2-continued

| | | | | | | | | |
|---|---|---|---|---|---|---|---|---|
| Comparative Example 7 | M-1 | 5 | B-1 | 25.36 | S-1 | 9 | PGMEA | 369 |
| Comparative Example 8 | M-1 | 5 | — | — | S-1 | 9 | PGMEA | 912 |
| Comparative Example 9 | — | — | — | — | S-1 | 9 | PGMEA | 149 |
| Comparative Example 10 | — | — | — | — | S-1 | 9 | PGMEA | 144 |
| Comparative Example 11 | M-2 | 10 | — | — | S-2 | 4 | PGMEA | 173 |
| Comparative Example 12 | — | — | — | — | S-2 | 9 | PGMEA | 188 |
| Comparative Example 13 | — | — | — | — | S-1 | 9 | PGMEA | 175 |
| Comparative Example 14 | M-2 | 5 | B-1 | 27.36 | S-2 | 5 | PGMEA | 192 |
| Comparative Example 15 | M-2 | 5 | B-1 | 27.36 | S-2 | 5 | PGMEA | 192 |
| Comparative Example 16 | M-1 | 5 | — | — | S-1 | 9 | PGMEA | 301 |

TABLE 3

| | Base Material | Trans-parency | Corrosion Prevention Performance | Hardness | Adhesion |
|---|---|---|---|---|---|
| Examples 1 | I | 2 | 4 | 5 | 4 |
| Examples 2 | I | 3 | 5 | 5 | 5 |
| Examples 3 | I | 2 | 5 | 4 | 5 |
| Examples 4 | I | 3 | 5 | 3 | 5 |
| Examples 5 | I | 2 | 5 | 3 | 5 |
| Examples 6 | I | 2 | 5 | 4 | 3 |
| Examples 7 | I | 3 | 5 | 5 | 5 |
| Examples 8 | I | 3 | 4 | 5 | 4 |
| Examples 9 | I | 2 | 5 | 5 | 5 |
| Examples 10 | I | 2 | 5 | 5 | 5 |
| Examples 11 | I | 2 | 4 | 5 | 5 |
| Examples 12 | I | 2 | 3 | 5 | 5 |
| Examples 13 | II | 2 | 3 | 5 | 5 |
| Examples 14 | II | 2 | 3 | 5 | 5 |
| Examples 15 | II | 2 | 4 | 4 | 3 |
| Examples 16 | I | 2 | 4 | 4 | 3 |
| Examples 17 | I | 2 | 4 | 4 | 3 |
| Examples 18 | I | 2 | 4 | 3 | 4 |
| Examples 19 | I | 2 | 5 | 3 | 3 |
| Examples 20 | II | 3 | 4 | 5 | 5 |
| Examples 21 | II | 3 | 5 | 5 | 5 |
| Examples 22 | I | 3 | 5 | 5 | 5 |
| Examples 23 | I | 3 | 5 | 5 | 5 |
| Examples 24 | I | 2 | 5 | 5 | 5 |
| Examples 25 | I | 2 | 5 | 5 | 5 |
| Examples 26 | I | 3 | 5 | 5 | 5 |
| Examples 27 | I | 3 | 5 | 5 | 5 |

TABLE 4

| | Base Material | Trans-parency | Corrosion Prevention Performance | Hardness | Adhesion |
|---|---|---|---|---|---|
| Comparative Example 1 | I | 3 | 5 | 2 | 1 |
| Comparative Example 2 | I | 3 | 5 | 1 | 2 |
| Comparative Example 3 | I | 2 | 1 | 5 | 4 |
| Comparative Example 4 | I | 2 | 2 | 4 | 3 |
| Comparative Example 5 | I | 2 | 2 | 5 | 4 |
| Comparative Example 6 | I | 2 | 2 | 5 | 4 |
| Comparative Example 7 | I | 1 | 4 | 1 | 2 |
| Comparative Example 8 | I | 3 | 4 | 1 | 1 |
| Comparative Example 9 | II | 2 | 1 | 5 | 4 |
| Comparative Example 10 | II | 2 | 1 | 5 | 4 |
| Comparative Example 11 | I | 1 | 2 | 4 | 4 |
| Comparative Example 12 | — | Did not dissolve in the preparation of dispersion | | | |
| Comparative Example 13 | — | Did not dissolve in the preparation of dispersion | | | |
| Comparative Example 14 | I | 1 | 4 | 3 | 1 |
| Comparative Example 15 | I | 1 | 4 | 4 | 2 |
| Comparative Example 16 | I | 1 | 2 | 1 | 1 |

The added amount of each of the components shown in Table 1 or Table 2 is the solid content thereof, and is shown in parts by mass. When the contents of the surfactant F-1 and the polymerization inhibitor J-1, which are not shown in Table 1 or Table 2, are converted to the solid contents in parts by mass as shown in Table 1, the solid content of the surfactant F-1 is 0.1 parts by mass, and the solid content of the polymerization inhibitor J-1 is 0.2 parts by mass.

Further, in each of Comparative Examples 12 and 13, T-2, T-3, or the like did not dissolve and precipitated, resulting in a failure to prepare a uniform dispersion liquid (photosensitive composition). Thus, it was unable to perform an evaluation.

Examples 28 to 39

Photosensitive compositions of Examples 28 to 39 were prepared, using the respective components shown in Table 5 in an amounts shown in Table 5, and using the same surfactant and polymerization inhibitor as in Example 1, in the same manner as in Example 1. Each of the photosensitive compositions of Examples 28 to 39 was adjusted to a solid content of 19%, with each of the solvents shown in Table 5. Each of the amounts of P-1 and P-4 in Table 5 indicates the solid content of the particles themselves. The resulting photosensitive compositions were evaluated in the same manner as in Example 1. The evaluation results are summarized in Table 6.

TABLE 5

| | Multifunctional Monomer | | Photopolymerization Initiator | | Silica Particles | | Heterocyclic Compound | |
|---|---|---|---|---|---|---|---|---|
| | Type | Added Amount | Type | Added Amount | Type | Added Amount | Type | Added Amount |
| Examples 28 | N-1 | 21.36 | K-1 | 3 | P-4 | 35 | T-4 | 2 |
| Examples 29 | N-1 | 45.72 | K-1 | 3 | P-4 | 35 | T-4 | 2 |
| Examples 30 | N-1/N-3 | 39.72/10.00 | K-1 | 3 | P-4 | 35 | T-4 | 2 |
| Examples 31 | N-4 | 21.36 | K-1 | 3 | P-4 | 35 | T-4 | 2 |
| Examples 32 | N-6 | 41.36 | K-1 | 3 | P-4 | 25 | T-4 | 2 |
| Examples 33 | N-6 | 55.72 | K-1 | 3 | P-4 | 25 | T-4 | 2 |
| Examples 34 | N-6 | 31.36 | K-1 | 3 | P-1 | 25 | T-4 | 2 |
| Examples 35 | N-6 | 55.72 | K-1 | 3 | P-1 | 25 | T-4 | 2 |
| Examples 36 | N-7 | 21.36 | K-1 | 3 | P-4 | 35 | T-4 | 2 |
| Examples 37 | N-7 | 45.72 | K-1 | 3 | P-4 | 35 | T-4 | 2 |
| Examples 38 | N-7 | 21.36 | K-1 | 3 | P-1 | 35 | T-4 | 2 |
| Examples 39 | N-7 | 45.72 | K-1 | 3 | P-1 | 35 | T-4 | 2 |

| | Maleimide Compound | | Resin | | Additive | | | C = C |
|---|---|---|---|---|---|---|---|---|
| | Type | Added Amount | Type | Added Amount | Type | Added Amount | Solvent Type | Equivalent (g/mol) |
| Examples 28 | M-1 | 5 | B-1 | 24.36 | S-1 | 9 | PGMEA/PGME = 5/5 | 228 |
| Examples 29 | M-1 | 5 | — | — | S-1 | 9 | PGMEA/PGME = 5/5 | 193 |
| Examples 30 | M-1 | 5 | — | — | S-1 | 5 | PGMEA/PGME = 5/5 | 222 |
| Examples 31 | M-1 | 5 | B-1 | 24.36 | S-1 | 9 | PGMEA/PGME = 5/5 | 215 |
| Examples 32 | M-1 | 5 | B-1 | 14.36 | S-1 | 9 | PGMEA/PGME = 5/5 | 236 |
| Examples 33 | M-1 | 5 | — | — | S-1 | 9 | PGMEA/PGME = 5/5 | 238 |
| Examples 34 | M-1 | 5 | B-1 | 24.36 | S-1 | 9 | PGMEA | 234 |
| Examples 35 | M-1 | 5 | — | — | S-1 | 9 | PGMEA | 238 |
| Examples 36 | M-1 | 5 | B-1 | 24.36 | S-1 | 9 | PGMEA/PGME = 5/5 | 242 |
| Examples 37 | M-1 | 5 | — | — | S-1 | 9 | PGMEA/PGME = 5/5 | 216 |
| Examples 38 | M-1 | 5 | B-1 | 24.36 | S-1 | 9 | PGMEA | 242 |
| Examples 39 | M-1 | 5 | — | — | S-1 | 9 | PGMEA | 216 |

TABLE 6

| | Base Material | Transparency | Corrosion Prevention Performance | Hardness | Adhesion |
|---|---|---|---|---|---|
| Examples 28 | II | 3 | 4 | 4 | 4 |
| Examples 29 | II | 2 | 4 | 4 | 4 |
| Examples 30 | II | 2 | 3 | 3 | 3 |
| Examples 31 | II | 2 | 3 | 4 | 4 |
| Examples 32 | II | 2 | 4 | 4 | 4 |
| Examples 33 | II | 2 | 4 | 4 | 4 |
| Examples 34 | II | 3 | 5 | 4 | 4 |
| Examples 35 | II | 3 | 5 | 4 | 4 |
| Examples 36 | II | 3 | 4 | 4 | 3 |
| Examples 37 | II | 3 | 3 | 4 | 4 |
| Examples 38 | II | 3 | 5 | 4 | 4 |
| Examples 39 | II | 3 | 4 | 4 | 4 |

The added amount of each of the components shown in Table 5 is the solid content thereof, and is shown in parts by mass. When the contents of the surfactant F-1 and the polymerization inhibitor J-1, which are not shown in Table 5, are converted to the solid contents in parts by mass as shown in Table 5, the solid content of the surfactant F-1 is 0.1 parts by mass, and the solid content of the polymerization inhibitor J-1 is 0.2 parts by mass.

The disclosures of Japanese Patent Application No. 2015-224382 filed on Nov. 17, 2015, and Japanese Patent Application No. 2016-049470 filed on Mar. 14, 2016 are incorporated herein by reference in their entirety.

All publications, patent applications, and technical standards mentioned in this specification are herein incorporated by reference to the same extent as if such individual publication, patent application, or technical standard was specifically and individually indicated to be incorporated by reference.

What is claimed is:

1. A photosensitive composition comprising:
   a compound having two or more ethylenically unsaturated bonds;
   a photopolymerization initiator;
   silica particles;
   at least one heterocyclic compound selected from the group consisting of a triazole compound, a tetrazole compound, a thiadiazole compound, a rhodanine compound, a benzothiazole compound and a benzimidazole compound;
   a maleimide compound; and
   a solvent;
   wherein an organic solid content per 1 mol of ethylenically unsaturated bonds in the photosensitive composition is 250 g/mol or less, and
   the content of the solvent in the photosensitive composition is from 100 to 3,000 parts by mass.

2. The photosensitive composition according to claim 1, wherein the photopolymerization initiator is an oxime ester compound.

3. The photosensitive composition according to claim 1, wherein a content of the silica particles with respect to a total solid content of the photosensitive composition is 5% by mass or more but less than 40% by mass.

4. The photosensitive composition according to claim 1, wherein the silica particles have an average primary particle size of from 1 to 30 nm.

5. The photosensitive composition according to claim 1, wherein the heterocyclic compound is a compound represented by any of the following Formula D1 to Formula D7 and Formula D9 to Formula D11:

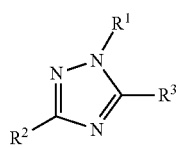

Formula D1

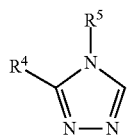

Formula D2

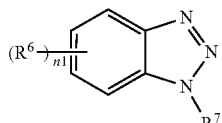

Formula D3

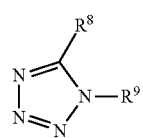

Formula D4

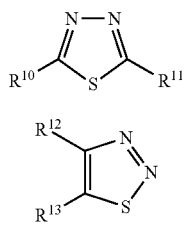

Formula D5

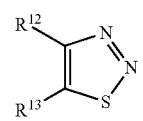

Formula D6

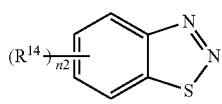

Formula D7

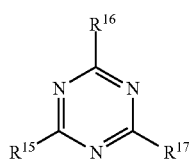

Formula D8

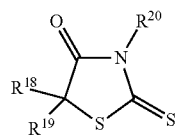

Formula D9

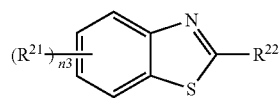

Formula D10

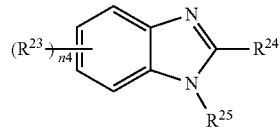

Formula D11 wherein, in Formula D1 to Formula D7 and Formula D9 to Formula D11, each of $R^1$, $R^5$, $R^7$, $R^9$, $R^{20}$ and $R^{25}$ independently represents a hydrogen atom, an alkyl group, an aryl group, an heteroaryl group or an amino group; each of $R^2$ to $R^4$, $R^8$, $R^{10}$ to $R^{13}$, $R^{18}$, $R^{22}$ and $R^{24}$ independently represents a hydrogen atom, an alkyl group, an aryl group, a heteroaryl group, an amino group, an alkylamino group, an arylamino group, a dialkylamino group, a diarylamino group, an alkylarylamino group, a mercapto group, an alkylthio group or an arylthio group; each of $R^6$, $R^{14}$, $R^{21}$ and $R^{23}$ independently represents a halogen atom, an alkyl group, an aryl group, a heteroaryl group, an amino group, an alkylamino group, an arylamino group, a dialkylamino group, a diarylamino group, an alkylarylamino group, a mercapto group, an alkylthio group, an arylthio group, a hydroxy group, an alkoxy group or an aryloxy group; $R^{19}$ represents a hydrogen atom, an alkyl group, an aryl group or a heteroaryl group; and each of n1 to n4 independently represents an integer from 0 to 4.

6. The photosensitive composition according to claim 5, wherein the heterocyclic compound is a compound represented by any of Formula D1, Formula D2 and Formula D4 to Formula D7, and Formula D9 to Formula D11.

7. The photosensitive composition according to claim 1, wherein the maleimide compound comprises a compound represented by the following Formula E1:

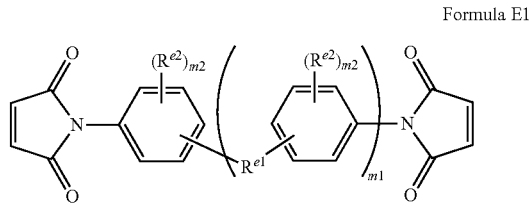

Formula E1 wherein, in Formula E1, each $R^{e1}$ independently represents a single bond, an alkylene group, —SO$_2$—, —SO—, —S— or —O—; each $R^{e2}$ independently represents a halogen atom or an alkyl group; m1 represents an integer from 0 to 5; and each m2 independently represents an integer from 0 to 4.

8. The photosensitive composition according to claim 1, wherein the compound having two or more ethylenically unsaturated bonds comprises a multifunctional (meth)acrylate compound.

9. A method of manufacturing a cured product, the method comprising, in the following order:
coating the photosensitive composition according to claim 1 on a substrate;
removing the solvent from the coated photosensitive composition;
exposing at least a part of the coated photosensitive composition from which the solvent has been removed to actinic radiation; and subjecting the exposed photosensitive composition to a heat treatment.

10. The method of manufacturing a cured product according to claim 9, further comprising:
developing the exposed photosensitive composition with an aqueous developer, after exposing at least a part of the coated photosensitive composition from which the solvent has been removed to actinic radiation and before subjecting the exposed photosensitive composition to a heat treatment.

11. A cured film obtained by curing the photosensitive composition according to claim 1.

12. The cured film according to claim 11, which is an interlayer insulating film or an overcoat film.

13. A display device comprising the cured film according to claim 11.

14. A touch panel comprising the cured film according to claim 11.

15. The photosensitive composition according to claim 1, wherein the heterocyclic compound is a compound selected from the group consisting of a tetrazole compound, a thiadiazole compound, a rhodanine compound, a benzothiazole compound and a benzimidazole compound.

16. The photosensitive composition according to claim 5, wherein the heterocyclic compound is a compound represented by any one of the Formula D4 to Formula D7, and Formula D9 to Formula D11.

* * * * *